US011792837B2

(12) United States Patent
Xue et al.

(10) Patent No.: US 11,792,837 B2
(45) Date of Patent: Oct. 17, 2023

(54) TECHNIQUES TO FACILITATE OPPORTUNISTIC CSI FOR SIDELINK COMMUNICATION

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/395,390

(22) Filed: Aug. 5, 2021

(65) Prior Publication Data

US 2023/0041572 A1     Feb. 9, 2023

(51) Int. Cl.
| | |
|---|---|
| *H04L 5/00* | (2006.01) |
| *H04W 72/20* | (2023.01) |
| *H04W 92/18* | (2009.01) |
| *H04W 72/542* | (2023.01) |
| *H04W 72/0446* | (2023.01) |
| *H04W 72/0453* | (2023.01) |

(52) U.S. Cl.
CPC .......... *H04W 72/542* (2023.01); *H04L 5/0057* (2013.01); *H04W 72/0446* (2013.01); *H04W 72/0453* (2013.01); *H04W 72/20* (2023.01); *H04W 92/18* (2013.01)

(58) Field of Classification Search
CPC ............ H04L 5/0057; H04W 72/0446; H04W 72/0453; H04W 72/20; H04W 72/542; H04W 92/18
See application file for complete search history.

(56) References Cited

U.S. PATENT DOCUMENTS

2023/0069141 A1*   3/2023   Yoshioka .............. H04L 5/0051

\* cited by examiner

*Primary Examiner* — Brian P Cox
(74) *Attorney, Agent, or Firm* — Procopio, Cory, Hargreaves & Savitch LLP

(57) ABSTRACT

Apparatus, methods, and computer-readable media for facilitating opportunistic CSI for sidelink communication are disclosed herein. An example method for wireless communication at a responding sidelink UE includes receiving, from an initiating sidelink UE, a request to provide CSI feedback to the initiating sidelink UE, the request excluding a CSI-RS. The example method also includes decoding a transmission from the initiating sidelink UE to a neighboring sidelink UE, the transmission including a CSI feedback trigger. The example method also includes transmitting, to the initiating sidelink UE, a CSI report based on the transmission.

30 Claims, 17 Drawing Sheets

P1 PROCEDURE

P2 PROCEDURE

P3 PROCEDURE

| CSI feedback trigger 902 (PSCCH DMRS, PSSCH DMRS, common S-CSI-RS) | Time-window 904 | Destination IDs 906 | Transmit power 908 (Range) | Threshold samples quantity 910 | Delta CQI 912 | Delta CQI thresholds 914 (First threshold, second threshold) |
|---|---|---|---|---|---|---|

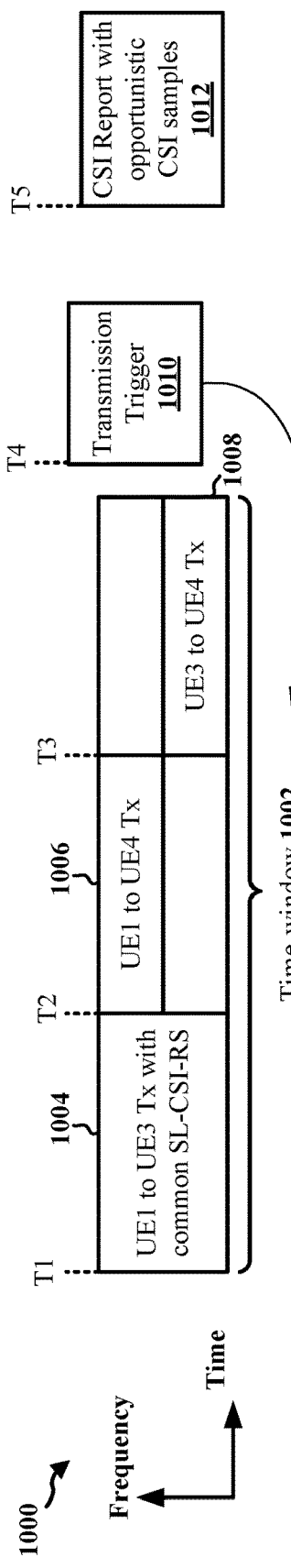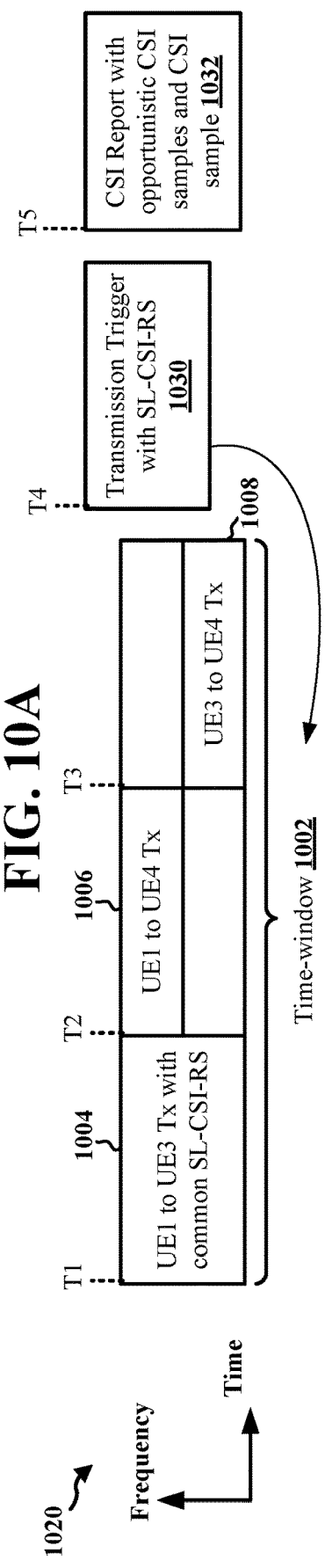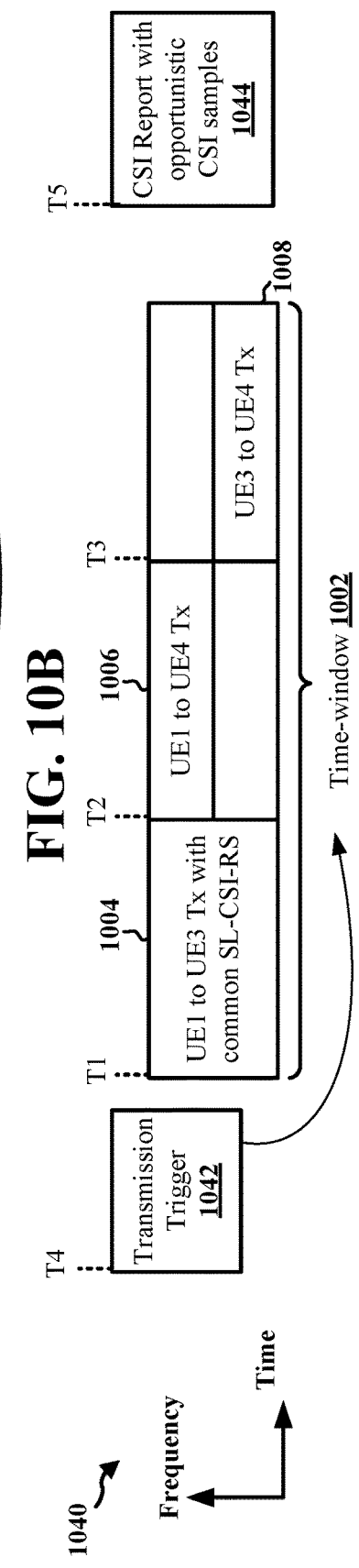
FIG. 10A
FIG. 10B
FIG. 10C

TECHNIQUES TO FACILITATE OPPORTUNISTIC CSI FOR SIDELINK COMMUNICATION

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a responding sidelink user equipment (UE). An example apparatus may receive, from an initiating sidelink UE, a request to provide channel state information (CSI) feedback to the initiating sidelink UE, the request excluding a CSI reference signal (CSI-RS). The example apparatus may also decode a transmission from the initiating sidelink UE to a neighboring sidelink UE, the transmission including a CSI feedback trigger. Additionally, the example apparatus may transmit, to the initiating sidelink UE, a CSI report based on the transmission.

In an aspect of the disclosure, a method, a computer-readable medium, and an apparatus are provided for wireless communication at an initiating sidelink UE. An example apparatus may transmit, to a responding sidelink UE, a request to provide CSI feedback, the request excluding a CSI-RS. The example apparatus may also transmit a transmission to a neighboring sidelink UE, the transmission including a CSI feedback trigger. Additionally, the example apparatus may receive, from the responding sidelink UE, a CSI report based on the transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 illustrates an example opportunistic CSI configuration, in accordance with various aspects of the present disclosure.

FIG. 10A illustrates an example in which a transmission trigger is received after a time-window, in accordance with various aspects of the present disclosure.

FIG. 10B illustrates an example in which a transmission trigger is received after the time-window and includes a sidelink CSI-RS, in accordance with various aspects of the present disclosure.

FIG. 10C illustrates an example in which a transmission trigger is received prior to the time-window, in accordance with various aspects of the present disclosure.

DETAILED DESCRIPTION

Figure 1:
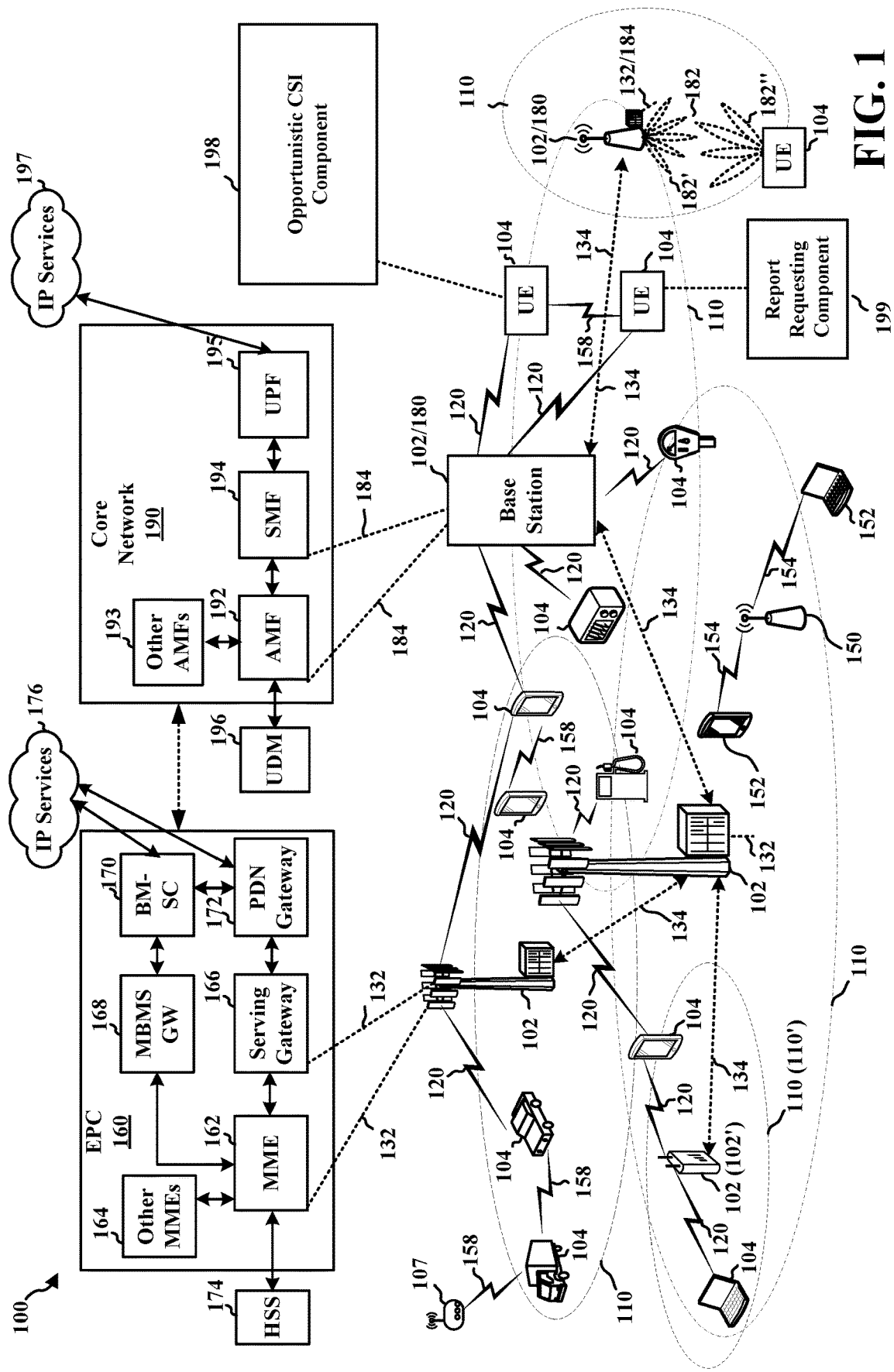
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink (e.g., a responding sidelink UE), may include an opportunistic CSI component 198 configured receive, from an initiating sidelink UE, a request to provide CSI feedback to the initiating sidelink UE, the request excluding a CSI-RS. The example opportunistic CSI component 198 may also be configured to decode a transmission from the initiating sidelink UE to a neighboring sidelink UE, the transmission including a CSI feedback trigger. Additionally, the example opportunistic CSI component 198 may be configured to transmit, to the initiating sidelink UE, a CSI report based on the transmission.

Still referring to FIG. 1, in certain aspects, a UE 104, or other device communicated based on sidelink (e.g., an initiating sidelink UE), may include a report requesting component 199 configured to transmit, to a responding sidelink UE, a request to provide CSI feedback, the request excluding a CSI-RS. The example report requesting component 199 may also be configured to transmit a transmission to a neighboring sidelink UE, the transmission including a CSI feedback trigger. Additionally, the example report requesting component 199 may be configured to receive, from the responding sidelink UE, a CSI report based on the transmission.

The aspects presented herein may enable obtaining wideband CSI while communicating using sidelink, which may facilitate improving communication performance, for example, by increasing throughput and improving spectral efficiency.

Although the following description provides examples directed to 5G NR (and, in particular, to sidelink communication), the concepts described herein may be applicable to other similar areas, such as LTE, LTE-A, CDMA, GSM, and/or other wireless technologies, in which devices communicate via sidelink.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
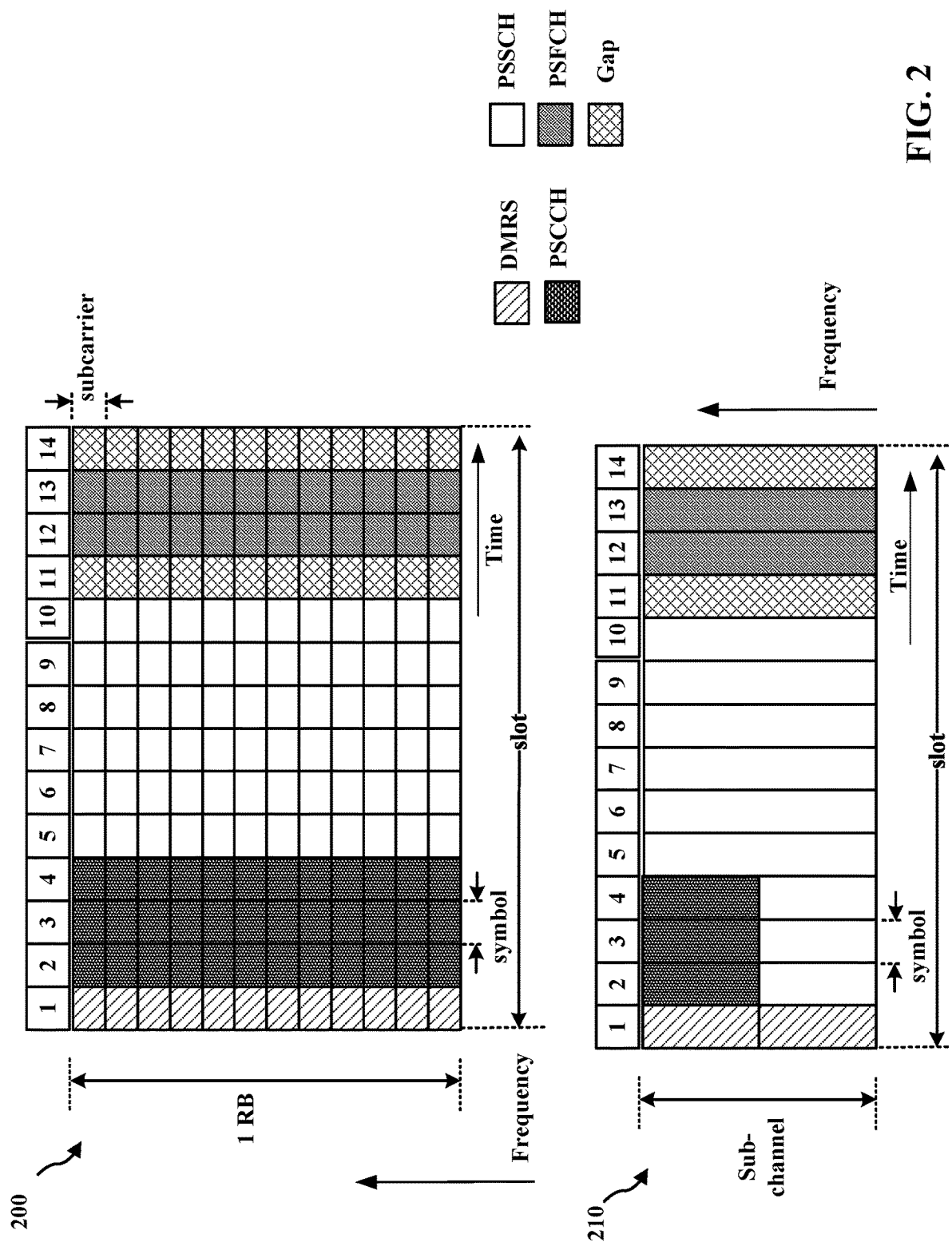
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
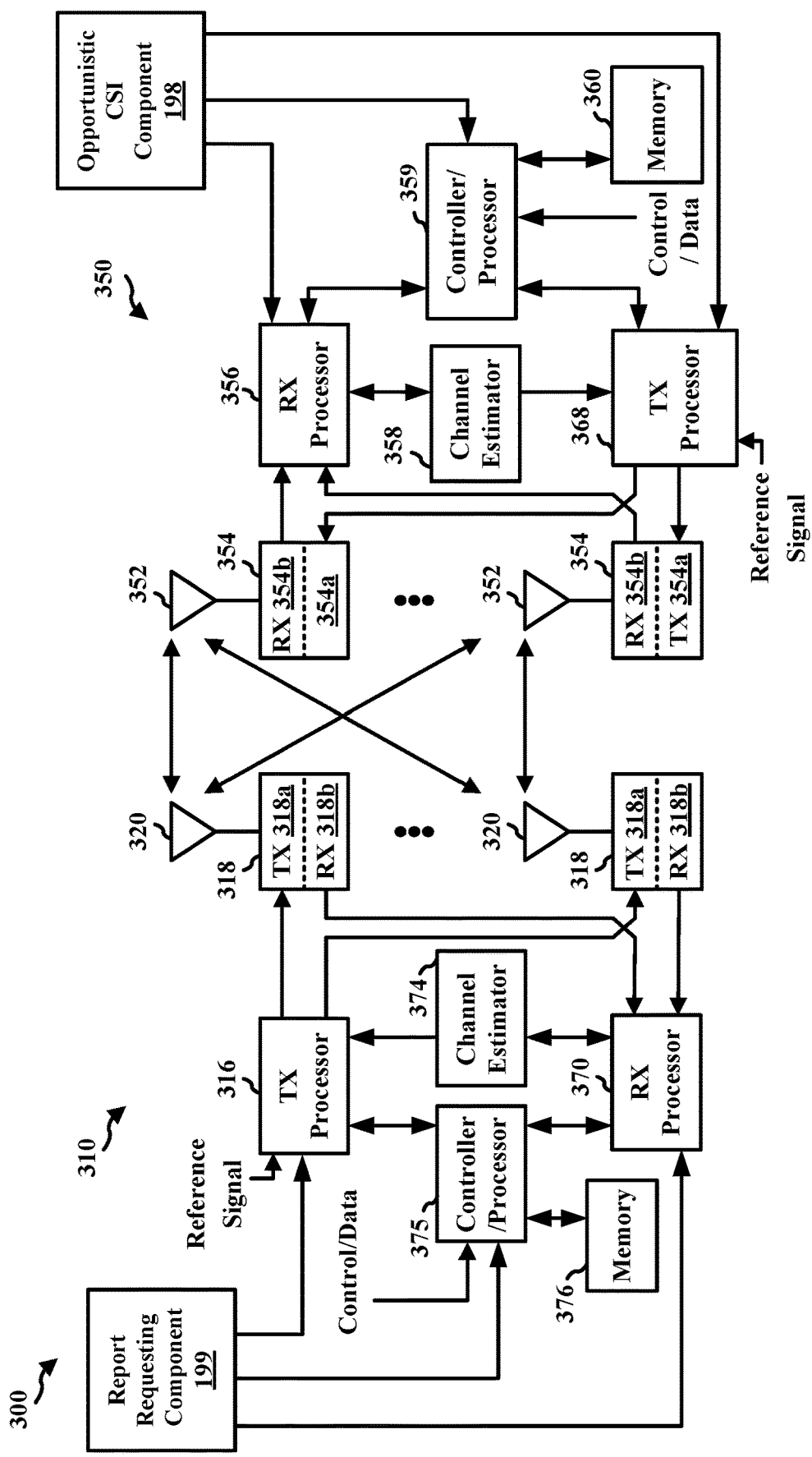
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the opportunistic CSI component 198 of FIG. 1.

At least one of the TX processor 316, the RX processor 370, and the controller/processor 375 may be configured to perform aspects in connection with the report requesting component 199 of FIG. 1.

Figure 4:
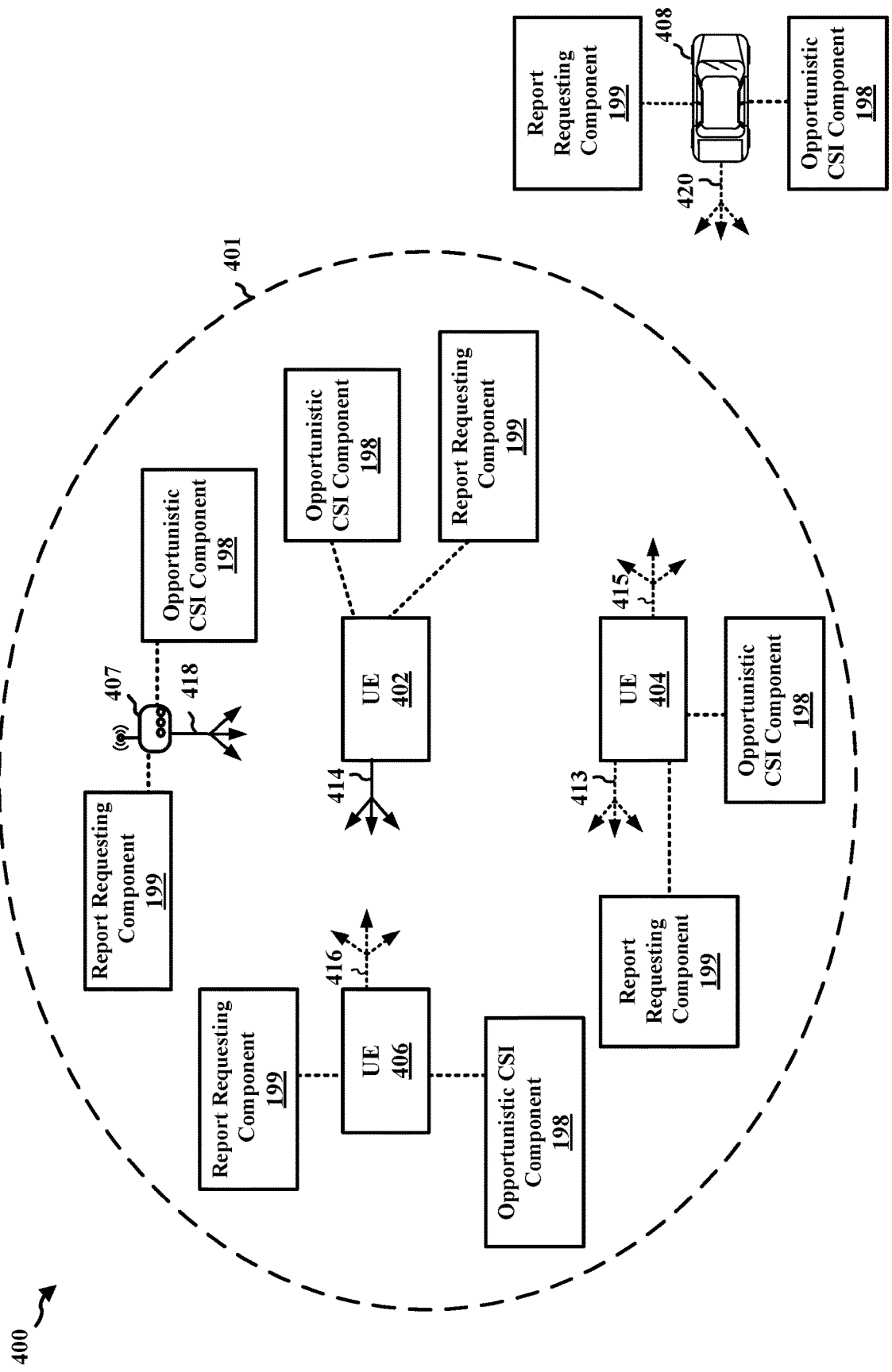
FIG. 4 illustrates example aspects of sidelink communication between devices, in accordance with aspects presented herein.

FIG. 4 illustrates an example 400 of sidelink communication between devices, as presented herein. The communication may be based on a slot structure comprising aspects described in connection with FIG. 2 or another sidelink structure. For example, a first UE 402 may transmit a sidelink transmission 414, e.g., comprising a control channel (e.g., PSCCH) and/or a corresponding data channel (e.g., PSSCH), that may be received by a second UE 404, a third UE 406, and/or a fourth UE 408. The sidelink transmission 414 may be received directly from the first UE 402, e.g., without being transmitting through a base station. Additionally, or alternatively, an RSU 407 may receive communication from and/or transmit communication to the UEs 402, 404, 406, 408. As shown in FIG. 4, the RSU 407 may transmit a sidelink transmission 418 that is received directly from the RSU 407.

The UEs 402, 404, 406, 408 and/or the RSU 407 may each be capable of operating as a transmitting device in addition to operating as a receiving device. Thus, the second UE 404 is illustrated as transmitting sidelink transmissions 413, 415, the third UE 406 is illustrated as transmitting a sidelink transmission 416, and the fourth UE 408 is illustrated as transmitting a sidelink transmission 420. One or more of the transmissions 413, 414, 415, 416, 418 may be broadcast or multicast to nearby devices. For example, the first UE 402 may transmit communication intended for receipt by other UEs within a range 401 of the first UE 402. In other examples, one or more of the transmissions 413, 414, 415, 416, 418 may be groupcast to nearby devices that are a member of a group. In other examples, one or more of the transmissions 413, 414, 415, 416, 418 may be unicast from one UE to another UE.

A sidelink transmission may provide sidelink control information (SCI) including information to facilitate decoding the corresponding data channel. The SCI may also include information that a receiving device may use to avoid interference. For example, the SCI may indicate reserved time resources and/or reserved frequency resources that will be occupied by the data transmission, and may be indicated in a control message from the transmitting device.

One or more of the UEs 402, 404, 406, 408 and/or the RSU 407 may include an opportunistic CSI component, similar to the opportunistic CSI component 198 described in connection with FIG. 1. One or more of the UEs 402, 404, 406, 408 and/or the RSU 407 may additionally or alternatively include a report requesting component, similar to the report requesting component 199 described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, and referring to the example of FIG. 1, a base station 102/180 may determine resources for sidelink communication and may allocate resources to different UEs 104 to use for sidelink transmissions. In this first mode, a UE receives the allocation of sidelink resources from the base station 102/180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
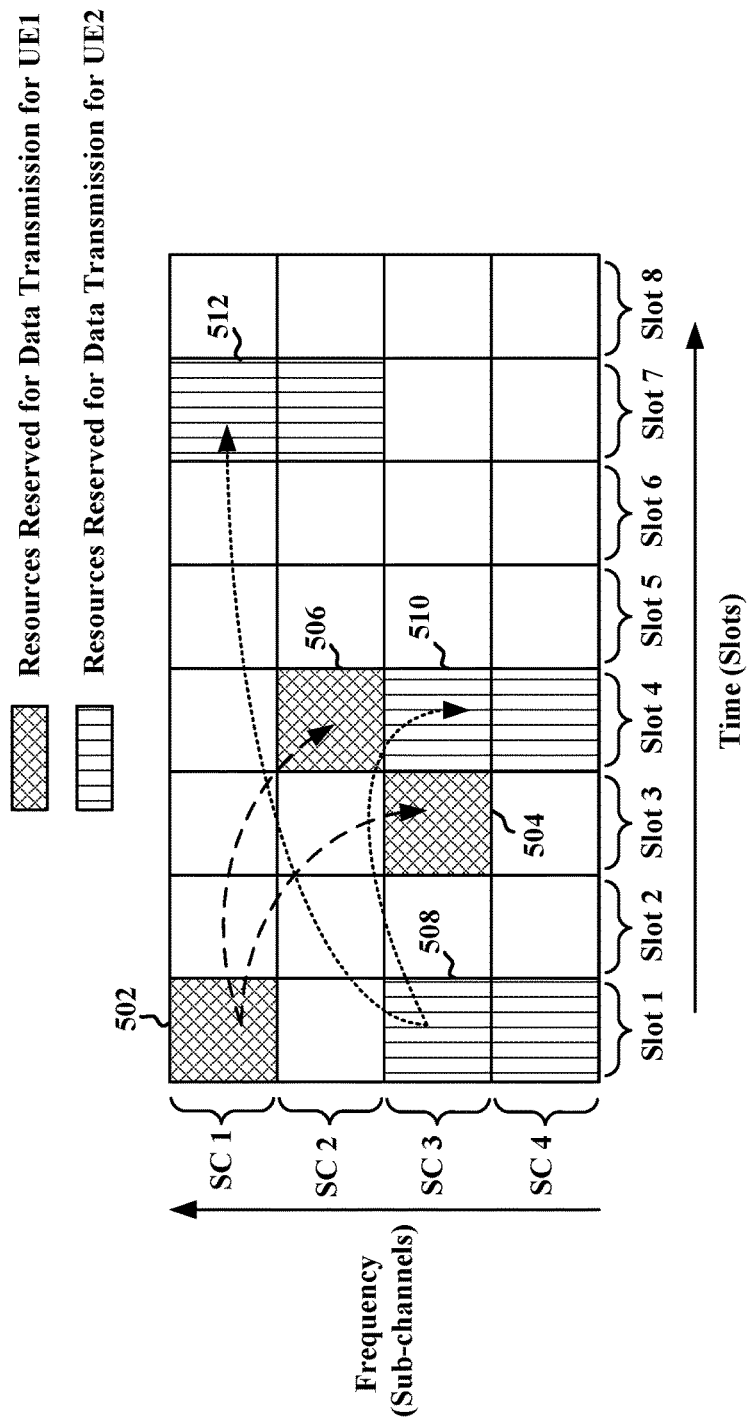
FIG. 5 illustrates examples of resource reservation for sidelink communication, in accordance with aspects presented herein.

FIG. 5 is an example 500 of time and frequency resources showing reservations for sidelink transmissions, as presented herein. The resources may be comprised in a sidelink resource pool, for example. The resource allocation for each UE may be in units of one or more sub-channels in the frequency domain (e.g., sub-channels SC1 to SC 4), and may be based on one slot in the time domain (e.g., slots 1 to 8). The UE may also use resources in the current slot to perform an initial transmission, and may reserve resources in future slots for retransmissions. In the illustrated example of FIG. 5, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., a first data retransmission 504 and a second data retransmission 506). For example, the first UE may reserve sub-channels SC 3 at slot 3 and SC 2 at slot 4 for future retransmissions as shown by FIG. 5. The first UE then transmits information regarding which resources are being used and/or reserved by it to other UE(s). The first UE may do so by including the reservation information in a reservation resource field of the SCI, e.g., a first stage SCI.

FIG. 5 illustrates that a second UE ("UE2") reserves resources in sub-channels SC 3 and SC 4 at slot 1 for its current data transmission 508, reserves a first data retransmission 510 at slot 4 using sub-channels SC 3 and SC 4, and reserves a second data retransmission 512 at slot 7 using sub-channels SC 1 and SC 2, as shown by FIG. 5. Similarly, the second UE may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the second UE may transmit SCI reserving resources for data transmissions 508, 510, and 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

A beamforming technology (e.g., 5G NR mmW technology) may use beam management procedures, such as beam measurements and beam switches, to maintain a quality of a link between a first device and a second device (e.g., an access link between a base station and a UE or a sidelink communication link between a first UE and a second UE) at a sufficient level. Beam management procedures aim to support mobility and the selection of the best beam pairing (or beam pair link (BPL)) between the first device and the second device. Beam selection may be based on a number of considerations including logical state, power saving, robustness, mobility, throughput, etc. For example, wide beams may be used for initial connection and for coverage/mobility and narrow beams may be used for high throughput scenarios with low mobility.

Figure 6A:
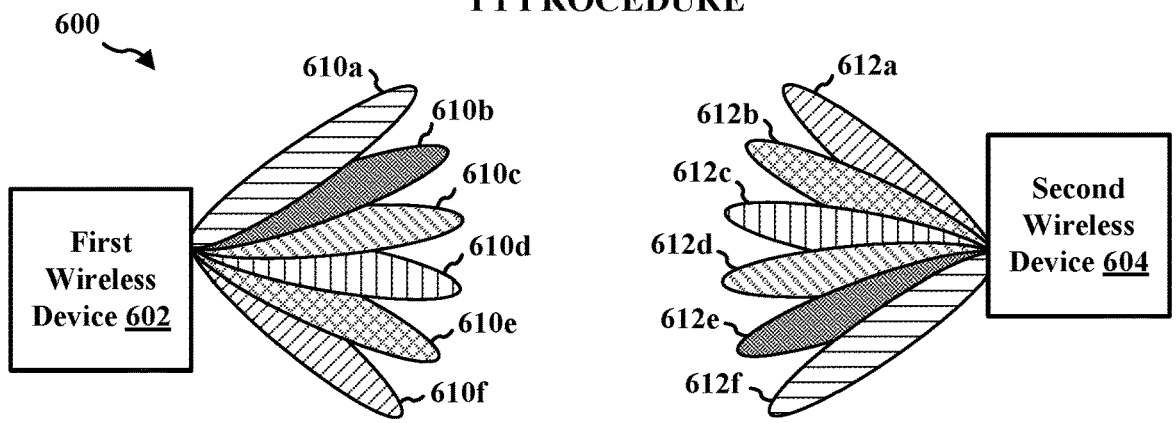
FIG. 6A illustrates an example of beam pair link (BPL) discovery and refinement, in accordance with various aspects of the present disclosure.
Figure 6B:
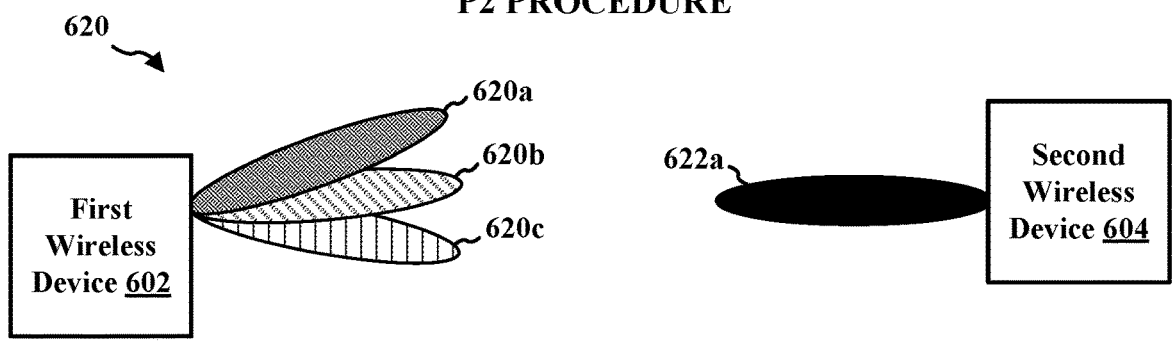
FIG. 6B illustrates another example of BPL discovery and refinement, in accordance with various aspects of the present disclosure.
Figure 6C:
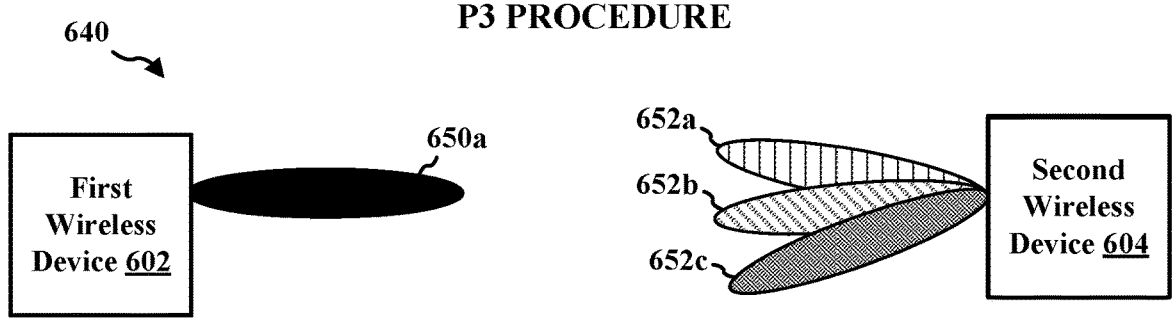
FIG. 6C illustrates another example of BPL discovery and refinement, in accordance with various aspects of the present disclosure.

FIGS. 6A, 6B, and 6C illustrate an example of beam pair link (BPL) discovery and refinement. In 5G NR, P1, P2, and P3 procedures are used for BPL discovery and refinement.

A P1 procedure enables the discovery of new BPLs. Referring to FIG. 6A, in a P1 procedure 600, a first wireless device 602 transmits different symbols of a reference signal (e.g., P1 signal), each beamformed in a different spatial direction. Stated otherwise, the first wireless device 602 transmits beams using different transmit beams (e.g., transmit beams 610a to 610f) over time in different directions. For successful reception of at least a symbol of the P1 signal, a second wireless device 604 searches for an appropriate receive beam. The second wireless device 604 searches using available receive beams (e.g., receive beams 612a to 612f) and applying a different receive beam during each occurrence of the periodic P1 signal.

Once the second wireless device 604 has succeeded in receiving a symbol of the P1 signal, the second wireless device 604 has discovered a BPL. In some aspects, the second wireless device 604 may not want to wait until it has found the best receive beam, since this may delay further actions. The second wireless device 604 may measure a signal strength (e.g., reference signal receive power (RSRP)) and report the symbol index together with the RSRP to the first wireless device 602. Such a report may contain the findings of one or more BPLs. In an example, the second wireless device 604 may determine a received signal having a high RSRP. The second wireless device 604 may not know which transmit beam the first wireless device 602 used to transmit. However, the second wireless device 604 may report to the first wireless device 602 the time at which the signal having a high RSRP was observed. The first wireless device 602 may receive this report and may determine which transmit beam the first wireless device 602 used at the given time.

The first wireless device 602 may then offer P2 and P3 procedures to refine an individual BPL. Referring to FIG. 6B, a P2 procedure 620 refines the beam (transmit beam) of a BPL at the first wireless device 602. The first wireless device 602 may transmit a set of symbols of a reference signal with different beams that are spatially close to the beam of the BPL (e.g., the first wireless device 602 may perform a sweep using neighboring beams around the selected beam). For example, the first wireless device 602 may transmit a plurality of transmit beams (e.g., transmit beams 620a, 620b, and 620c) over a consecutive sequence of symbols, with a different beam per symbol. In the P2 procedure 620, the second wireless device 604 keeps its receive beam (e.g., a receive beam 622a) constant. Thus, the second wireless device 604 uses the same beam as in the BPL. The beams used by the first wireless device 602 for the P2 procedure 620 may be different from those used for the P1 procedure in that they may be spaced closer together or they may be more focused. The second wireless device 604 may measure the signal strength (e.g., RSRP) for the various beams (e.g., the beams 620a, 620b, and 620c) and indicate the strongest beam and/or the highest RSRP to the first wireless device 602. Additionally, or alternatively, the second wireless device 604 may indicate all RSRPs measured for the beams. The second wireless device 604 may indicate such information via a CSI-RS resource indicator feedback message, which may contain the RSRPs of the received beams (e.g., the beams 620a, 620b, 620c) in a sorted manner. The first wireless device 602 may switch an active beam to the strongest beam reported, thus keeping the RSRP of the BPL at a highest level and supporting low mobility. If the transmit beams used for the P2 procedure 620 are spatially close (or even partially overlapped), no beam switch notification may be sent to the second wireless device 604.

Referring to FIG. 6C, a P3 procedure 640 refines the beam (receive beam) of a BPL at the second wireless device 604. In this example, the second wireless device 604 transmits a same transmit beam 650a over a consecutive sequence of symbols. The second wireless device 604 may use this opportunity to refine the receive beam by checking a strength of multiple receive beams (from the same or different panels). That is, while the transmit beam stays constant, the second wireless device 604 may scan using different receive beams (e.g., the second wireless device 604 performs a sweep using neighboring beams (e.g., receive beams 652a, 652b, and 652c)). The second wireless device 604 may measure the RSRP of each receive beam and identify the best beam. Afterwards, the second wireless device 604 may use the best beam for the BPL. The second wireless device 604 may or may not send a report of RSRP(s) of the receive beam to the first wireless device 602. By the end of the P2 and P3 procedures, the refined transmit beam at the first wireless device 602 and the refined receive beam at the second wireless device 604 maximize the RSRP of the BPL.

Sidelink communication may be used in V2X scenarios to facilitate the exchange of safety-related messages to nearby UEs. Such messages may be periodical and of a relatively small packet size. In some examples, the UEs may exchange the messages over a sub-6 GHz licensed frequency spectrum (or band). However, not all UEs may have access to the sub-6 GHz licensed frequency spectrum. Additionally, there may be additional bandwidth in unlicensed frequency spectrums that is available. For example, there may be approximately 1.8 GHz available in the 5 GHz/6 GHz unlicensed frequency spectrum and approximately 7 GHz available in the 60 GHz unlicensed frequency spectrum. Such wider bandwidths may enable different deployment scenarios than those used for V2X communication.

Additionally, while V2X facilitates a peer-to-peer topology, a star topology includes a hub UE that operates as an information source and/or an information sink for one or more peripheral UEs. For example, an industrial IoT (IIoT) deployment may include a programmable logical controller (PLC) that controls one or more sensors/actuators (SAs) in the IIoT deployment. The PLC may establish an access link with a base station and establish sidelink communication links with the one or more SAs.

In contrast to the periodic and small packet size traffic in some V2X deployments, the traffic in the IIoT deployment may include burst traffic. The burst traffic may use wideband transmissions to allow the transmitting UE to promptly clean its data buffer and avoid congestion.

Additionally, in deployment scenarios in which the UEs have the capability to communicate over higher frequency bands, beamforming alignment procedures may be beneficial to improve communication performance. For example, beamforming alignment procedures may improve coverage and/or book peak data rates in the 60 GHz frequency spectrum. For example, in sidelink communication, a UE may be configured to communicate using eight different beams. Beamforming alignment procedures may enable a first UE to determine which beams a second UE is using to communicate and plan accordingly.

Channel state information (CSI) provides information about a particular channel. An initiating device may request a responding device to provide a CSI report based upon measurements. The CSI report may include one or more of channel quality indicators (CQI), rank indicators (RI), and precoding matrix indicators (PMI). The initiating device may use the CSI report to facilitate performing beam management procedures, radio link failure detection procedures, beam failure detection and recovery procedures, etc. In some examples, the initiating device may use the CSI report to identify a modulation and coding scheme (MCS) to use for transmissions.

Figure 7A:
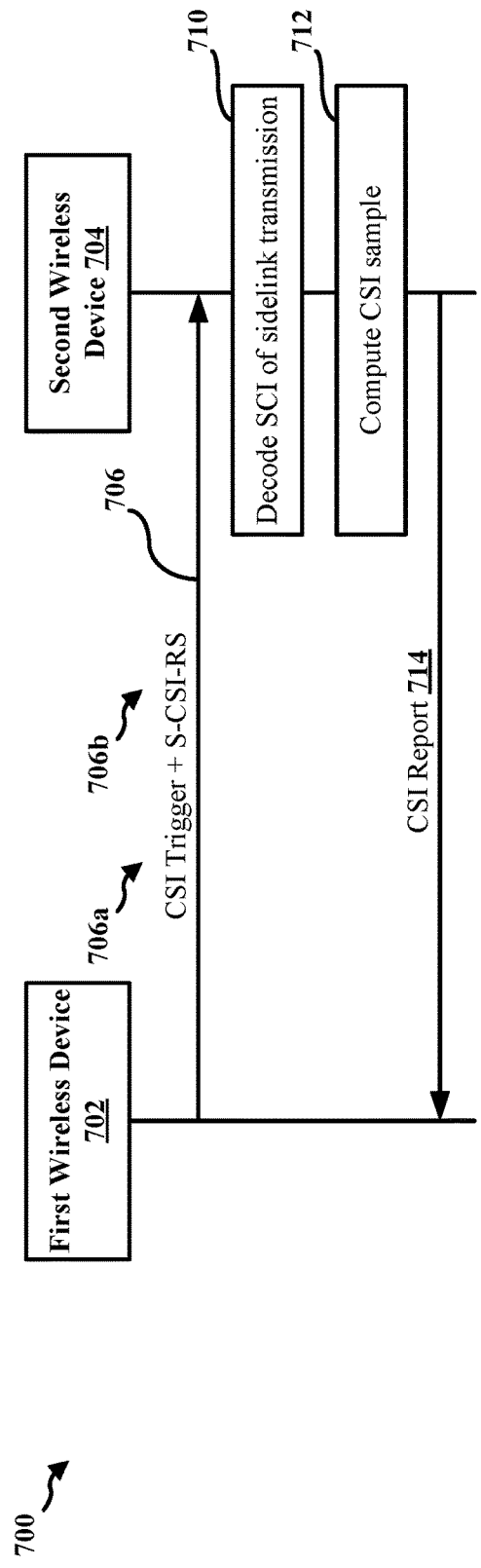
FIG. 7A illustrates an example CSI reporting procedure between a first sidelink device and a second sidelink device, in accordance with various aspects of the present disclosure.

The responding device generates the CSI report based on a CSI reference signal (CSI-RS). In sidelink communication, the sidelink CSI-RS (S-CSI-RS) is included in a sidelink transmission along with a request to provide the CSI report. For example, FIG. 7A illustrates an example CSI reporting procedure 700 between a first sidelink device 702 and a second sidelink device 704, as presented herein. In the illustrated example, the first sidelink device 702 is an initiating sidelink UE that initiates a CSI reporting mechanism by transmitting a request that is received by the second sidelink device 704. The second sidelink device 704 is a responding sidelink UE that provides a CSI report to the first sidelink device 702 based on the request.

In the illustrated example of FIG. 7A, the first sidelink device 702 transmits a sidelink transmission 706 that is received by the second sidelink device 704. The sidelink transmission 706 includes a CSI trigger 706a and a sidelink CSI-RS 706b. The CSI trigger 706a may be a 1-bit trigger included in sidelink control information (SCI) of the sidelink transmission 706 (e.g., a two-stage SCI). The CSI trigger 706a may cause the second sidelink device 704 to compute a CSI sample with respect to the sidelink CSI-RS 706b. The sidelink CSI-RS 706b may be included (e.g., embedded) in radio resources of the sidelink data portion (PSSCH) of the sidelink transmission 706.

In the illustrated example of FIG. 7A, the second sidelink device 704 receives and processes the sidelink transmission 706. For example, at 708, the second sidelink device 704 decodes the SCI of the sidelink transmission 706. The SCI includes control information regarding the intended target of the sidelink transmission 706 and how to decode the sidelink transmission 706. For example, the SCI may include a destination identifier (ID) that indicates the target UE of the sidelink transmission 706. After decoding the SCI, the second sidelink device 704 may determine whether it is the intended target of the sidelink transmission 706. In the illustrated example, the second sidelink device 704 is the intended target and proceeds to decode the remainder of the sidelink transmission 706. For example, based on the decoding of the SCI, the second sidelink device 704 may detect the CSI trigger 706a and the sidelink CSI-RS 706b.

At 712, the second sidelink device 704 computes a CSI sample based on the CSI trigger 706a and the sidelink CSI-RS 706b. For example, the CSI sample may include a rank indicator (e.g. a 1-bit RI) and channel quality indicators (e.g., a 4-bit CQI) based on measurements of the sidelink CSI-RS 706b.

In the illustrated example, the second sidelink device 704 transmits a CSI report 714 that is received by the first sidelink device 702. The CSI report 714 includes the computed CSI sample. The second sidelink device 704 may transmit the CSI report 714 via a MAC-control element (MAC-CE). The second sidelink device 704 may transmit the CSI report 714 independent of a data transmission to the first sidelink device 702.

As shown in FIG. 7A, the CSI reporting procedure 700 facilitates aperiodic CSI reporting based on the inclusion of the CSI trigger 706a and the sidelink CSI-RS 706b. However, the CSI report 714 includes one CSI sample (e.g., at 712) and is a narrowband CSI based on the limited subchannels used to transmit the sidelink transmission 706.

The CSI reporting procedure 700 may facilitate CSI reporting in a V2X scenario.

However, in higher frequency spectrums, an initiating sidelink UE may benefit with wideband CSI. For example, wideband CSI may enable the initiating sidelink UE to pursue frequency diversity and/or multi-user diversity. Additionally, beamforming alignment procedures use beam-dependent CSI. However, the dedicated beamforming alignment procedures including both transmit sweeping and receive sweeping (e.g., as described in connection with the examples of FIGS. 6A, 6B, and 6C) may resource expensive and time-consuming.

Aspects disclosed herein provide techniques for obtaining wideband CSI and/or beam-dependent CSI. For example, disclosed techniques enable a first sidelink UE to configure a second sidelink UE to report CSI to the first sidelink UE without including a sidelink CSI-RS in a sidelink transmission to the second sidelink UE. That is, the second sidelink UE may compute a CSI sample based on a sidelink transmission intended for a third sidelink UE. For example, the first sidelink UE may transmit a sidelink transmission to a third sidelink UE and include a common sidelink CSI-RS. The common sidelink CSI-RS may be received and processed by a group of UEs, such as the second sidelink UE and the third sidelink UE. In such examples, the second sidelink UE may use the common sidelink CSI-RS to compute a CSI sample even though the sidelink transmission is intended for the third sidelink UE. As used herein, CSI (e.g., a CSI sample, CSI feedback, and/or a CSI report) that is based on a sidelink transmission intended for another UE may be referred to as "opportunistic CSI." For example, in the above example, the first sidelink UE may configure the second sidelink UE to provide "opportunistic CSI feedback." Additionally, the CSI sample computed by the second sidelink UE based on the sidelink transmission to the third sidelink UE may be referred to as an "opportunistic CSI sample." Further, a CSI report that includes an opportunistic CSI sample may be referred to as an "opportunistic CSI report."

Figure 7C:
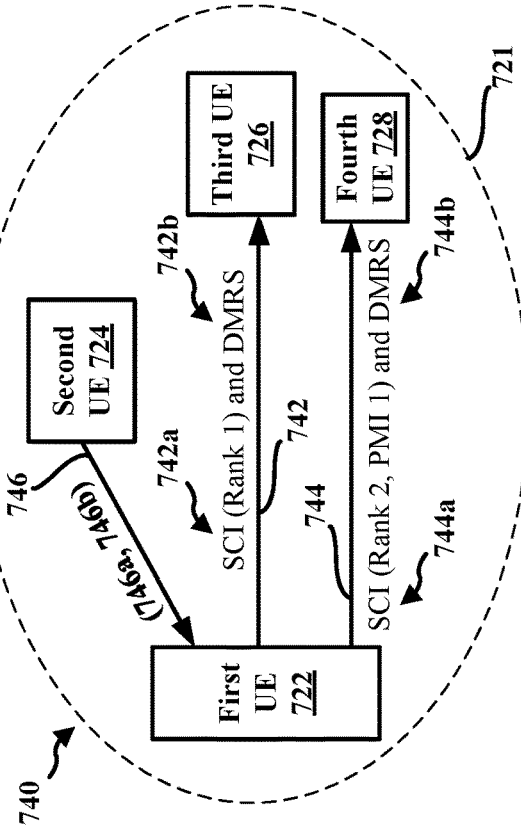
FIG. 7C illustrates an example communication environment including a first UE, a second UE, a third UE, and a fourth UE, in accordance with various aspects of the present disclosure.
Figure 7B:
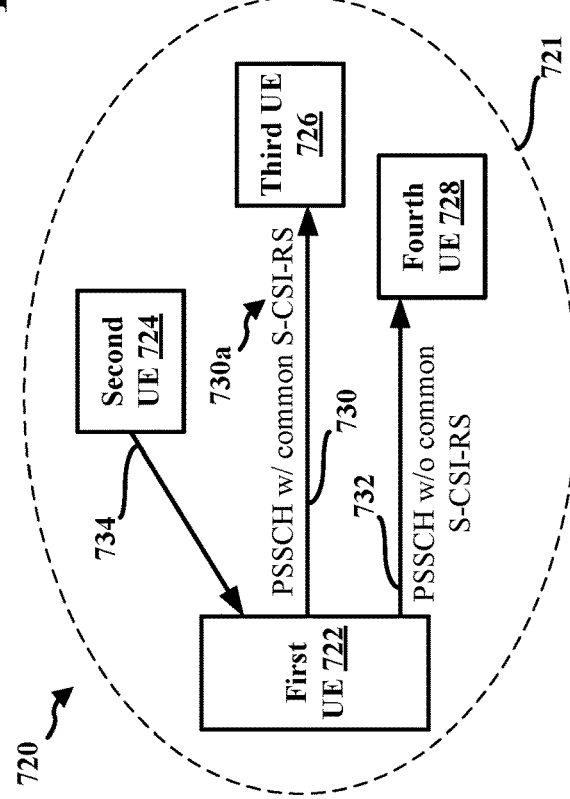
FIG. 7B illustrates an example communication environment including a first UE, a second UE, a third UE, and a fourth UE, in accordance with various aspects of the present disclosure.

FIG. 7B illustrates an example communication environment 720 including a first UE 722, a second UE 724, a third UE 726, and a fourth UE 728, as presented herein. The example UEs 722, 724, 726, 728 of FIG. 7B may be part of a group of UEs. In the illustrated example, the first UE 722 may transmit sidelink transmissions that may be received by UEs within a range 721 of the first UE 722. For example, the first UE 722 may transmit a first sidelink transmission 730 that is directed to the third UE 726 (e.g., the intended target of the first sidelink transmission 730 is the third UE 726). However, the first sidelink transmission 730 may also be received by the second UE 724 and the fourth UE 728. Similarly, while the first UE 722 may transmit a second sidelink transmission 732 that is directed to the fourth UE 726, the second UE 724 and the third UE 726 may also receive the second sidelink transmission 732.

As described above, the sidelink transmission may include SCI regarding the intended target of the sidelink transmission and how to decode the sidelink transmission. For example, the SCI of the first sidelink transmission 730 may include a destination identifier (ID) that indicates the target UE of the first sidelink transmission 730 is the third UE 726. Similarly, the second sidelink transmission 732 may include a destination ID that indicates the target of the second sidelink transmission 732 is the fourth UE 728.

In the illustrated example of FIG. 7B, the first sidelink transmission 730 includes a sidelink data channel (PSSCH) with a common sidelink CSI-RS 730a. The common sidelink CSI-RS 730a may be configured without UE-specific analog filtering applied to an antenna port so that the common sidelink CSI-RS 730a is a non-UE-specific CSI-RS. In such examples, the other UEs (e.g., the second UE 724 and the fourth UE 728) may be configured to decode the SCI and process the common sidelink CSI-RS 730a. For example, the second UE 724 may compute a CSI sample based on the common sidelink CSI-RS 730a. Computing the CSI sample based on the common sidelink CSI-RS 730a may be similar to computing the CSI sample based on the CSI trigger 706a and the sidelink CSI-RS 706b (e.g., at 712) of FIG. 7A. For example, the CSI sample may include a rank indicator and CQI. However, in contrast to the CSI sample of FIG. 7A, the second UE 724 of FIG. 7B computes the opportunistic CSI sample based on a sidelink transmission for which the second UE 724 is not the intended target.

In the illustrated example of FIG. 7B, although the second UE 724 and the third UE 726 may receive the second sidelink transmission 732, the second UE 724 and the third UE 726 may not compute opportunistic CSI samples as the second sidelink transmission 732 does not include a common sidelink CSI-RS. In some such examples, the second sidelink transmission 732 may include a UE-specific CSI-RS, such as the sidelink CSI-RS 706b of FIG. 7A, that the fourth UE 728 may use to compute a CSI sample.

The second UE 724 may transmit a CSI report 734 that is received by the first UE 722. The CSI report 734 may include the opportunistic CSI sample computed based on the first sidelink transmission 730 directed to the third UE 726. The second UE 724 may transmit the CSI report 734 periodically to the first UE 722 and/or may transmit the CSI report 734 based on an occurrence of an event, such as reception of a request from the first UE 722 and/or a detected change in CSI between a first CSI sample and a second CSI sample. The second UE 724 may transmit the CSI report 734 via a MAC-CE and/or using a sidelink feedback channel (PSFCH).

Additionally, in some examples, aspects disclosed herein facilitate providing opportunistic CSI based on demodulation reference signals (DMRS) intended for another UE. In sidelink, a transmitting device may include a DMRS in a sidelink transmission to support demodulating or otherwise decoding of the sidelink transmission by a receiving device. The DMRS may be included with a control information portion of the sidelink transmission (e.g., PSCCH DMRS) and/or with a data portion of the sidelink transmission (e.g., PSSCH DMRS).

FIG. 7C illustrates another example communication environment 740 including the first UE 722, the second UE 724, the third UE 726, and the fourth UE 728, as presented herein. Similar to the example of FIG. 7B, the first UE 722 may transmit sidelink transmissions that may be received by UEs within the range 721 of the first UE 722. In the illustrated example of FIG. 7C, the UEs 722, 724, 726, 728 may be part of a group of UEs.

In the illustrated example of FIG. 7C, the first UE 722 transmits a first sidelink transmission 742 that is directed to the third UE 726. The first UE 722 also transmits a second sidelink transmission 744 that is directed to the fourth UE 728.

The first sidelink transmission 742 and the second sidelink transmission 744 may include SCI that is decodable by the UEs of the group of UEs. For example, the first sidelink transmission 742 includes SCI 742a including a rank indicator ("Rank 1"). The example second sidelink transmission 744 includes SCI 744a including a rank indicator ("Rank 2") and a precoding matrix indicator ("PMI 1"). The PMI may also be referred to as a "transmitted PMI" or "TPMI." In some examples, the SCI may additionally or alternatively include a transmission configuration indicator (TCI) associated with the beam used to transmit the respective sidelink transmission. The rank indicator, the PMI/TPMI, and/or the TCI may be referred to herein as "spatial transmit identifiers."

In the illustrated example, the second UE 724 may compute a first opportunistic CSI sample 746a based on the first sidelink transmission 742 directed to the third UE 726. The second UE 724 may also compute a second opportunistic CSI sample 746b based on the second sidelink transmission 744 directed to the fourth UE 728.

As shown in FIG. 7C, the first sidelink transmission 742 also includes DMRS 742b. The second sidelink transmission 744 also includes DMRS 744b. The respective DMRS 742b, 744b may be PSCCH DMRS and/or PSSCH DMRS. The opportunistic CSI samples computed by the second UE 724 may include DMRS CQI that is based on the respective DMRS 742b, 744b and the respective spatial transmit identifiers. In such examples, the second UE 724 may include a beam-dependent label with the opportunistic CSI samples. For example, the second UE 724 may include the spatial transmit identifiers associated with the first sidelink transmission 742 (e.g., rank 1) with the first opportunistic CSI sample 746a. The second UE 724 may include the spatial transmit identifiers associated with the second sidelink transmission 744 (e.g., rank 2, PMI 1) with the second opportunistic CSI sample 746b.

In the illustrated example of FIG. 7C, the second UE 724 transmits a CSI report 746 that is received by the first UE 722. The CSI report 746 may include the first opportunistic CSI sample 746a and/or the second opportunistic CSI sample 746b. The opportunistic CSI samples 746a, 746b may include the respective spatial transmit identifiers. The second UE 724 may transmit the CSI report 746 periodically to the first UE 722 and/or may transmit the CSI report 746 based on an occurrence of an event, such as reception of a request from the first UE 722 and/or a detected change in CSI between a first CSI sample and a second CSI sample. The second UE 724 may transmit the CSI report 746 via a MAC-CE and/or using a sidelink feedback channel (PSFCH).

In some examples, the second UE 724 may use the spatial transmit identifiers to select a beam to use to transmit the CSI report 746 to the first UE 722. For example, the based on the spatial transmit identifiers, the second UE 724 may determine that the first UE 722 used a first beam to transmit the first sidelink transmission 742 and used a second beam to transmit the second sidelink transmission 744. In some such examples, based on the used beams, the second UE 724 may determine to use a beam that is unused (e.g. a third beam).

In some examples, the first UE 722 may use the opportunistic CSI samples 746a, 746b to improve performing the beamforming alignment procedure, for example, with the second UE 724. For example, the first UE 722 may use the opportunistic CSI samples 746a, 746b to reduce the quantity of beams used for the sweeping, as described in connection with FIGS. 6A, 6B, and 6C.

As described herein, the disclosed techniques enable a sidelink UE to compute opportunistic CSI based on sidelink transmissions that are directed to another UE. Such techniques may be implemented in sidelink communication in which the SCI is decodable by multiple UEs (e.g., UEs within a range of the transmitting UE). In contrast, when communicating via a Uu interface, the control information of a downlink transmission (e.g., DCI) from a base station to a UE may be scrambled using a UE radio network temporary identifier (RNTI) and transmitted over a UE-specific search space. The downlink CSI-RS may also be configured in a UE-specific manner such that just the intended target of the downlink transmission is able to decode the transmission. Additionally, or alternatively, the DCI may not include a PMI/TPMI indicating how the DMRS is pre-coded.

Figure 8:
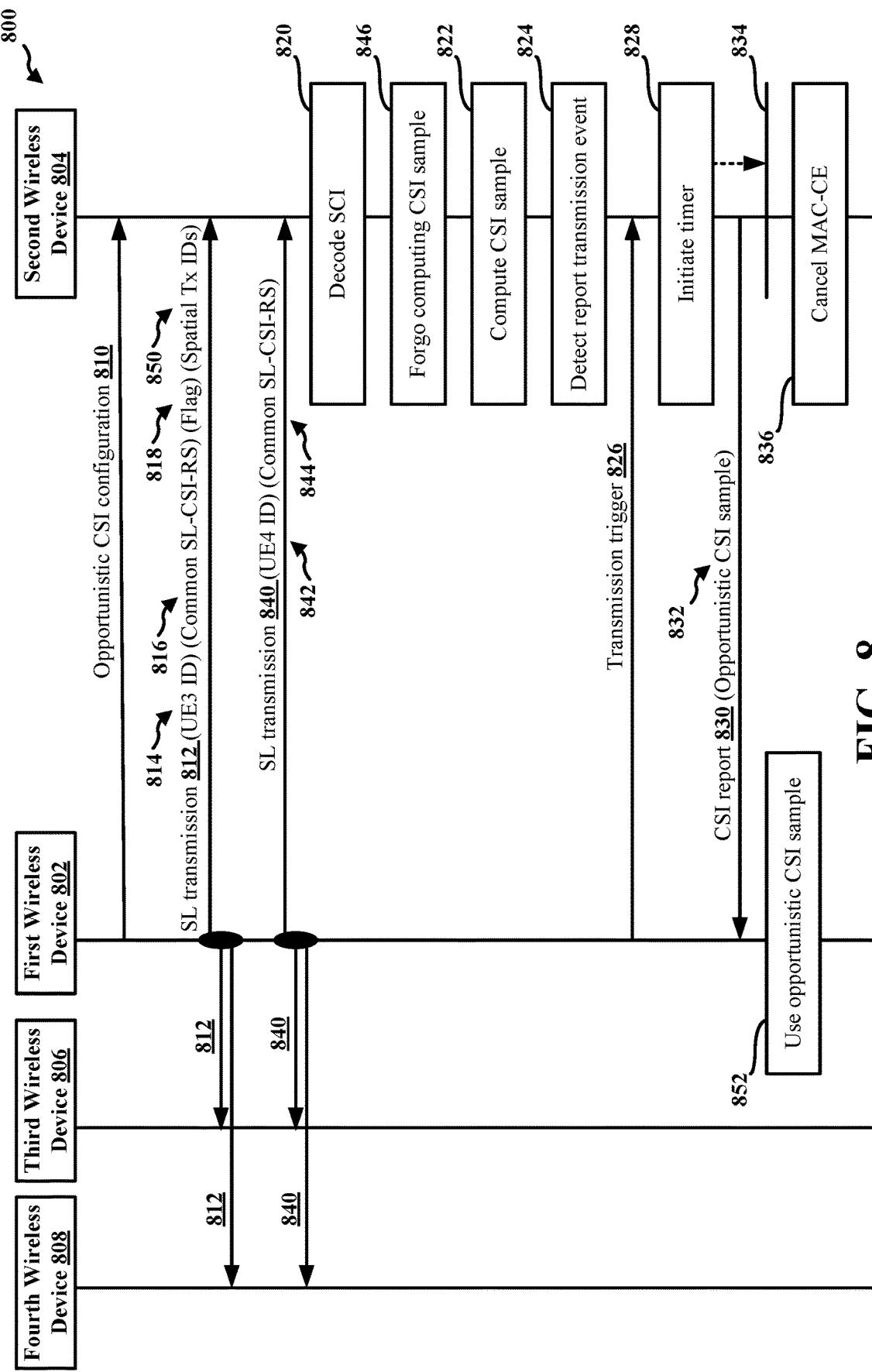
FIG. 8 illustrates an example communication flow between a first wireless device, a second wireless device, a third wireless device, and a fourth wireless device, in accordance with various aspects of the present disclosure.

FIG. 8 illustrates an example communication flow 800 between a first wireless device 802, a second wireless device 804, a third wireless device 806, and a fourth wireless device 808, as presented herein. In the illustrated example, the communication flow 800 facilitates the obtaining of opportunistic CSI that may include wideband CSI and/or beam-dependent CSI. Aspects of the wireless devices 802, 804, 806, 808 may be implemented by the UE 104 of FIG. 1, the first wireless communication device 310 of FIG. 3, and/or the second wireless communication device 350 of FIG. 3. Although not shown in the illustrated example of FIG. 8, in additional or alternative examples, the wireless devices 802, 804, 806, 808 may be in communication with one or more base stations or other UEs.

In the illustrated example of FIG. 8, the second wireless device 804, the third wireless device 806, and the fourth wireless device 808 may be within a range of the first wireless device 802 to receive sidelink transmissions from the first wireless device 802. In the illustrated example, the first wireless device 802, the second wireless device 804, and the third wireless device 806 are included in a group of UEs and the fourth wireless device 808 is excluded from the group of UEs.

In the illustrated example of FIG. 8, the first wireless device 802 is an initiating sidelink UE that requests the second wireless device 804 to report CSI while foregoing the inclusion of a sidelink CSI-RS with the request. For example, in contrast to the example of FIG. 7A in which the request for the CSI report includes the CSI trigger 706a and the sidelink CSI-RS 706b, the example of FIG. 8 enables the first wireless 802 to de-couple the request for the CSI report and the sidelink CSI-RS.

For example, the first wireless device 802 may transmit an opportunistic CSI configuration 810 that is received by the second wireless device 804. The first wireless device 802 may transmit the opportunistic CSI configuration 810 via unicast to the second wireless device 804. The opportunistic CSI configuration 810 may configure the second wireless device 804 to provide opportunistic CSI (e.g., CSI based on transmissions directed to other UEs). In some examples, the first wireless device 802 may transmit the opportunistic CSI configuration 810 via Layer 3 (L3) signaling.

FIG. 9 illustrates an example opportunistic CSI configuration 900, as presented herein. In the illustrated example, the opportunistic CSI configuration 900 includes CSI feedback trigger information 902, time-window information 904, destination identifiers information 906, transmit power information 908, threshold samples quantity information 910, delta CQI information 912, and delta CQI thresholds information 914. It may be appreciated that in other examples, the opportunistic CSI configuration 900 may include additional or alternative information that facilitates a responding sidelink UE to provide opportunistic CSI.

The CSI feedback trigger information 902 may indicate signals that a responding sidelink UE is to use to compute an opportunistic CSI sample. For example, the CSI feedback trigger information 902 may indicate that the responding sidelink UE is to monitor for a common sidelink CSI-RS, for PSCCH DMRS, and/or for PSSCH DMRS. In some examples, the CSI feedback trigger information 902 may include an identifier of the respective CSI feedback trigger. For example, the CSI feedback trigger information 902 may include an identifier for a common sidelink CSI-RS.

The time-window information 904 may indicate a set of time-frequency resources that the responding sidelink UE is to monitor for sidelink transmissions that may cause the responding sidelink UE to compute an opportunistic CSI sample. For example, the time-window information 904 may indicate a time-window of three-slots during which the responding sidelink UE may receive a sidelink transmission including a CSI feedback trigger to cause the responding sidelink UE to compute an opportunistic CSI sample.

The destination identifiers information 906 may indicate a set of destination identifiers (IDs) associated with a group of UEs. In some examples, the responding sidelink UE may be configured to compute opportunistic CSI samples based on sidelink transmission directed to UEs included in the group of UEs. For example, the responding sidelink UE may decode the SCI of a sidelink transmission and determine whether the intended target of the sidelink transmission is a UE included in the group of UEs based on the transmission destination ID included in the SCI. When the intended target is a UE included in the group of UEs, the responding sidelink UE may compute an opportunistic CSI sample based on the sidelink transmission.

The transmit power information 908 may indicate a transmit power that an initiating sidelink UE is using to transmit sidelink transmissions to UEs included in the group of UEs. In some examples, the transmit power information 908 may indicate a transmit power range within which the initiating sidelink UE may transmit sidelink transmissions to UEs included in the group of UEs.

The threshold samples quantity information 910 may indicate a threshold quantity of CSI samples to include in a CSI report. For example, the responding sidelink UE may be configured to periodically transmit a CSI report to the initiating sidelink UE. In some examples, when a CSI report transmission occasion occurs, the responding sidelink UE may first determine whether the quantity of computed opportunistic CSI samples satisfies the threshold quantity of CSI samples (e.g., determine if the quantity of computed opportunistic CSI samples is greater than or equal to the threshold quantity of CSI samples) or fails to satisfy the threshold quantity of CSI samples (e.g., determine if the quantity of computed opportunistic CSI samples is less than the threshold quantity of CSI samples). In such examples, if the responding sidelink UE determines that the threshold quantity of CSI samples is satisfied, the responding sidelink UE transmits the CSI report using the CSI report transmission occasion. Otherwise, the responding sidelink UE may skip transmitting the CSI report at the CSI report transmission occasion. In such examples, the responding sidelink UE may wait until the CSI report transmission occasion to again determine if threshold quantity of CSI samples is satisfied.

The delta CQI information 912 may indicate that the responding sidelink UE is to provide an indication of a change in CQI. For example, the change in CQI may include an increase in opportunistic CQI, a decrease in opportunistic CQI, or no-change. In some example, the change in CQI may be with respect to a previous CSI report. For example, the previous CSI report may indicate a first CQI and a current CSI report may indicate a second CQI. Based on a comparison of the first CQI to the second CQI, the responding sidelink UE may transmit an indication of a change in CQI.

The delta CQI thresholds information 914 may include one or more thresholds to use to indicate the change in CQI. For example, the responding sidelink UE may transmit a first value when the change in CQI is greater than a first threshold, may transmit a second value when the change in CQI is less than the first threshold, and may transmit a third value when there is no change in CQI. In some examples, the delta CQI thresholds information 914 may include a first threshold and a second threshold. For example, the responding sidelink UE may transmit a first value when the change in CQI is greater than the first threshold, may transmit a second value when the change in CQI is less than the second threshold, and may transmit a third value otherwise.

Returning to the example of FIG. 8, the first wireless device 802 may transmit a sidelink transmission 812 that is received by the second wireless device 804, the third wireless device 806, and the fourth wireless device 808. In the illustrated example, the sidelink transmission 812 is directed to the third wireless device 806. For example, the sidelink transmission 812 may include a transmission destination identifier 814 associated with the third wireless device 806 ("UE3 ID"). The sidelink transmission 812 also includes a common sidelink CSI-RS 816 that the second wireless device 804 may use to compute a CSI sample. In some examples, the second wireless device 804 may identify the common sidelink CSI-RS 816 based on the CSI feedback trigger information 902 provided via the opportunistic CSI configuration 810.

As described above, the opportunistic CSI configuration 810 may include destination identifiers information 906 that indicates a set of transmission destination identifiers associated with a group of UEs for which a responding sidelink UE is to compute opportunistic CSI samples. In the illustrated example of FIG. 8, the third wireless device 806 is included in the group of UEs.

At 820, the second wireless device 804 may decode the SCI of the sidelink transmission 812. For example, the second wireless device 804 may determine, based on the SCI, that the sidelink transmission 812 is directed to a UE included in the group of UEs. In some examples, the second wireless device 804 may also determine spatial transmit identifiers associated with the sidelink transmission 812 based on the SCI. For example, the second wireless device 804 may determine a rank indicator, a PMI/TPMI, and/or a TCI associated with the sidelink transmission 812.

At 822, the second wireless device 804 computes an opportunistic CSI sample 832. For example, the second wireless device 804 may compute a rank indicator and a CQI based on the common sidelink CSI-RS 816 of the sidelink transmission 812. The rank indicator may indicate a number of MIMO layers. The CQI may indicate a signal to interference plus noise ratio that is different than a signal strength. The CQI may be signaled using 4-bits. A high CQI value indicates an ability to receive high order modulation with a high coding rate.

The second wireless device 804 may then transmit a CSI report 830 including the opportunistic CSI sample 832. The second wireless device 804 may transmit the CSI report 830 via a MAC-CE and/or via sidelink feedback channel (PSFCH). The CSI report 830 may report opportunistic CSI samples computed in a time-window. For example, the CSI report 830 may include the opportunistic CSI samples computed in a time-window indicated by the time-window information 904 of the opportunistic CSI configuration 900.

As described above, in some examples, the opportunistic CSI samples may be computed for sidelink transmissions directed to a group of UEs. For example, in the example of FIG. 8, the first wireless device 802, the second wireless device 804, and the third wireless device 806 are part of a group of UEs for which opportunistic CSI samples may be provided. In such examples, when the first wireless device 802 transmits a sidelink transmission to a UE included in the group of UEs, the first wireless device 802 may apply a same transmit power to the sidelink transmission or with a transmit power that is within a range.

In some examples, when the second wireless device 804 receives a sidelink transmission that is directed to a UE that is not included in the group of UEs, the second wireless device 804 may forgo computing an opportunistic CSI sample. For example, the first wireless device 802 may transmit a second sidelink transmission 840 that is received by the second wireless device 804, the third wireless device 806, and the fourth wireless device 808. As shown in FIG. 8, the second sidelink transmission 840 includes a transmission destination identifier 842 and a common sidelink CSI-RS 844. In the illustrated example, the second sidelink transmission 840 is directed to the fourth wireless device 808, which is not included group of UEs.

At 820, the second wireless device 804 may decode the SCI of the second sidelink transmission 840 and determine the intended target of the second sidelink transmission 840 based on the transmission destination identifier 842. For example, the transmission destination identifier 842 ("UE4 ID") may indicate that the second sidelink transmission 840 is directed to the fourth wireless device 808. In some such examples in which the intended target is a UE not included in the group of UEs, the second wireless device 804 may, at 846, forgo computing an opportunistic CSI sample based on the common sidelink CSI-RS 844 provided with the second sidelink transmission 840.

In some examples, the first wireless device 802 may include a flag in the SCI of a sidelink transmission to indicate whether the second wireless device 804 is to compute an opportunistic CSI sample for a particular sidelink transmission. For example, the example sidelink transmission 812 includes a flag 818, which may be a 1-bit value. The flag 818 may be set to a first value (e.g., a "0") to indicate to the second wireless device 804 to forego computing an opportunistic CSI sample (e.g., at 846). The flag 818 may be set to a second value (e.g., a "1") to indicate to the 804 to compute the opportunistic CSI sample 832 (e.g., at 822). The second wireless device 804 may determine the value of the flag 818 when decoding the SCI of the sidelink transmission 812 (e.g., at 820).

In some examples, providing the flag 818 may enable the first wireless device 802 to transmit sidelink transmissions with different transmit powers. For example, the first wireless device 802 may transmit sidelink transmissions to UEs included in the group of UEs (e.g., the UEs 802, 804, 806) using a transmit power indicated by the transmit power information 908 of the opportunistic CSI configuration 900 of FIG. 9. However, in some examples, the first wireless device 802 may determine to transmit a sidelink transmission using a different transmit power. For example, the first wireless device 802 may transmit the sidelink transmission 812 using a smaller transmit power, for example, to avoid or reduce interference. In such examples, the first wireless device 802 may set the flag 818 to the second value (e.g., "1") to indicate to the second wireless device 804 to still compute the opportunistic CSI sample 832.

However, in examples in which the first wireless device 802 is configured to use just the transmit power indicated in the opportunistic CSI configuration, the first wireless device 802 may forego including the flag in the sidelink transmissions. In some such examples, the size of the SCI may be reduced by the 1-bit allocated to the flag.

In some examples, the first wireless device 802 may transmit sidelink transmissions including spatial transmit identifiers ("Spatial Tx IDs") that enable the second wireless device 804 to compute opportunistic CSI samples based on spatially pre-coded DMRS (e.g., PSCCH DMRS and/or PSSCH DMRS). For example, the spatial transmit identifiers may include a rank indicator, PMI/TPMI, and/or TCI. For example, the first wireless device 802 may transmit the sidelink transmission 812 including spatial transmit identifiers 850 that provide information regarding a particular spatial transmit scheme or beam associated with the sidelink transmission 812. In such examples, the second wireless device 804 may compute the opportunistic CSI sample 832 based on the spatial transmit identifiers 850 and label the opportunistic CSI sample 832 as beam-dependent (e.g., based on the spatial transmit identifiers 850).

At 852, the first wireless device 802 may use the opportunistic CSI sample 832. For example, the first wireless device 802 may use the opportunistic CSI sample 832 to perform a beamforming alignment procedure, as described above in connection with the examples of FIGS. 6A, 6B, 6C, and 7C.

In some example, the second wireless device 804 may transmit the CSI report 830 based on a report transmission event. For example, at 824, the second wireless device 804 may detect the occurrence of a report transmission event. In some examples, the occurrence of the report transmission event may include receiving a transmission trigger 826 from the first wireless device 802.

For example, FIGS. 10A, 10B, and 10C illustrate different aspects of the transmission trigger 826 with respect to a time-window. In the illustrated examples of FIGS. 10A, 10B, and 10C, a responding sidelink UE (e.g., the second wireless device 804 of FIG. 8) is configured to compute opportunistic CSI samples for sidelink transmissions received during a time-window 1002. As shown in the examples of FIGS. 10A, 10B, and 10C, the time-window 1002 includes three time slots. However, other example time-windows may include additional or alternative quantities of time slots.

In the illustrated examples, the responding sidelink UE may receive a first transmission 1004 at a first time (T1) of the time-window 1002, may receive a second transmission 1006 at a second time (T2) of the time-window 1002, and may receive a third transmission 1008 at a third time (T3) of the time-window 1002.

As shown in the illustrated examples, the first transmission 1004 is transmitted by a first UE ("UE1"), directed to a third UE ("UE3"), and includes a common sidelink CSI-RS. Aspects of the first transmission 1004 may be similar to the sidelink transmission 812 of FIG. 8. The second transmission 1006 is transmitted by the first UE and directed to a fourth UE ("UE4"). Aspects of the second transmission 1006 may be similar to the second sidelink transmission 840 of FIG. 8. The third transmission 1008 is transmitted by the third UE and directed to the fourth UE.

FIG. 10A illustrates an example 1000 in which a transmission trigger 1010 is received after the time-window 1002, as presented herein. For example, the responding sidelink UE may receive the transmission trigger 1010 at a fourth time (T4) that occurs after the third time in the time-domain. The transmission trigger 1010 may cause the responding sidelink UE to transmit a CSI report 1012 including one or more opportunistic CSI samples via a MAC-CE. The responding sidelink UE may transmit the CSI report 1012 at a fifth time (T5) that occurs after reception of the transmission trigger 1010 at the fourth time. As shown in FIG. 10A, the CSI report 1012 includes opportunistic CSI samples. For example, the responding sidelink UE may be configured to compute opportunistic CSI samples during the time-window 1002. In the example of FIG. 10A, the responding sidelink UE may compute an opportunistic CSI sample based on the first transmission 1004 including the common sidelink CSI-RS. Thus, the CSI report 1012 may include the opportunistic CSI sample based on the first transmission 1004.

In some such examples, an initiating sidelink UE may transmit the transmission trigger 1010 after transmitting a threshold quantity of common sidelink CSI-RS. By waiting to transmit the transmission trigger 1010 until the threshold quantity of common sidelink CSI-RS is satisfied, the initiating sidelink UE avoids the responding sidelink UE transmitting a CSI report with no opportunistic CSI samples or a limited quantity of opportunistic CSI samples. The responding sidelink UE may transmit the CSI report 1012 via the MAC-CE independent of a data transmission. Aspects of transmitting the CSI report 1012 via the MAC-CE are described in connection with 828, 834, and 836 of FIG. 8.

FIG. 10B illustrates an example 1020 in which a transmission trigger 1030 is received after the time-window 1002 and includes a sidelink CSI-RS, as presented herein. For example, the responding sidelink UE may receive the transmission trigger 1030 at the fourth time (T4) that occurs after the third time in the time-domain. For example, the responding sidelink UE may receive the transmission trigger 1010 at a fourth time (T4) that occurs after the third time in the time-domain. The transmission trigger 1030 may cause the responding sidelink UE to transmit a CSI report 1032 including one or more opportunistic CSI samples via a MAC-CE. The responding sidelink UE may transmit the CSI report 1032 at a fifth time (T5) that occurs after reception of the transmission trigger 1030 at the fourth time.

As shown in FIG. 10B, the transmission trigger 1030 includes a sidelink CSI-RS. In such examples, the transmission trigger 1030 may be similar to the example sidelink transmission 706 of FIG. 7A including the CSI trigger 706a and the sidelink CSI-RS 706b. In such examples, the responding sidelink UE may compute a CSI sample based on the sidelink CSI-RS, as described in connection with FIG. 7A. Similar to the example of FIG. 10A, the responding sidelink UE may be configured to compute opportunistic CSI samples during the time-window 1002. Thus, the responding sidelink UE may transmit the opportunistic CSI samples and the computed CSI sample via the CSI report 1032. That is, the CSI report 1032 may include CSI samples based on sidelink transmissions directed to other UEs (e.g. opportunistic CSI samples) and may also include a CSI sample based on a sidelink transmission directed to the responding sidelink UE (e.g., based on the sidelink CSI-RS of the transmission trigger 1030).

The CSI sample based on the transmission trigger 1030 may include narrowband CSI based on the sub-channels occupied by the sidelink data channel of the transmission trigger 1030. The opportunistic CSI samples may include additional CSI on other sub-channels, such as the sub-channels used to transmit the first transmission 1004. Thus, the CSI report 1032 may provide wideband CSI to the initiating sidelink UE as the CSI report 1032 includes CSI samples computed around more sub-channels than just the sub-channels occupied by the transmission trigger 1030, as described in connection with the example of FIG. 7A.

In some examples, the initiating sidelink UE may transmit the transmission trigger 1030 using a threshold quantity of sub-channels so that the responding sidelink UE has resources available to include the opportunistic CSI samples along with the CSI sample based on the transmission trigger 1030. That is, if the quantity of sub-channels associated with the transmission trigger 1030 is greater than the threshold quantity, then the responding sidelink UE may be unable to include the opportunistic CSI samples with the CSI report 1032 and/or may drop one or more of the opportunistic CSI samples. The responding sidelink UE may transmit the CSI report 1032 via the MAC-CE independent of a data transmission. Aspects of transmitting the CSI report 1032 via the MAC-CE are described in connection with 828, 834, and 836 of FIG. 8.

FIG. 10C illustrates an example 1040 in which a transmission trigger 1042 is received prior to the time-window 1002, as presented herein. For example, the responding sidelink UE may receive the transmission trigger 1042 at a fourth time (T4) that occurs before the first time in the time-domain. The transmission trigger 1042 may cause the responding sidelink UE to transmit a CSI report 1044 including one or more opportunistic CSI samples via a MAC-CE. The responding sidelink UE may transmit the CSI report 1044 at a fifth time (T5) that occurs after the time-window 1002 in the time-domain. As shown in FIG. 10C, the CSI report 1044 includes opportunistic CSI samples. For example, the responding sidelink UE may be configured to compute opportunistic CSI samples during the time-window 1002. In the example of FIG. 10C, the transmission trigger 1042 may cause the responding sidelink UE to compute opportunistic CSI samples for upcoming sidelink transmissions. Thus, while the transmission trigger 1010 of FIG. 10A may cause the responding sidelink UE to transmit previously computed opportunistic CSI samples, the transmission trigger 1042 of FIG. 10C may cause the responding sidelink UE to compute opportunistic CSI samples on-demand. Similar to the examples of FIGS. 10A and 10B, the responding sidelink UE may compute an opportunistic CSI sample based on the first transmission 1004 received during the time-window 1002. In some examples, the end of the time-window 1002 may trigger the responding sidelink UE to transmit the CSI report 1044. The responding sidelink UE may transmit the CSI report 1044 via the MAC-CE independent of a data transmission. Aspects of transmitting the CSI report 1012 via the MAC-CE are described in connection with 828, 834, and 836 of FIG. 8.

Referring again to the example of FIG. 8, in some examples, the occurrence of the report transmission event may include a periodic CSI transmission occasion. In some examples, the occurrence of the report transmission event may include detecting a change in a measurement between a first CSI sample and a second CSI sample. In some examples, the occurrence of the report transmission event may include detecting a change in a sidelink synchronization signal block (S-SSB) signal measurement, such as S-SSB RSRP.

In some examples, the second wireless device 804 may attempt to transmit the CSI report 830 via a MAC-CE after detecting the occurrence of the report transmission event. For example, at 828, the second wireless device 804 may initiate a timer after detecting the occurrence of the report transmission event. The second wireless device 804 may then attempt to transmit the CSI report 830 while the timer is active (or running). In some examples, attempting to transmit the CSI report 830 while the timer is active may include transmitting a scheduling request to a base station when, for example, the second wireless device 804 is utilizing centralized resource allocation (e.g., Mode 1).

In examples in which the second wireless device 804 transmits the MAC-CE including the CSI report 830 while the timer is active, the second wireless device 804 stops the timer. In examples in which the second wireless device 804 is unable to transmit the MAC-CE while the timer is active, the second wireless device 804 may skip transmitting the MAC-CE. For example, at 834, the timer initiated at 828 may expire. If, at 834, the second wireless device 804 is unable to transmit the MAC-CE including the CSI report 830, then the second wireless device 804 may cancel the MAC-CE (e.g. at 836).

In some examples, the second wireless device 804 may be configured to transmit the CSI report 830 at CSI report transmission occasions. In some examples, the CSI report transmission occasions may be periodic. For example, at a CSI report transmission occasion, the second wireless device 804 may transmit the CSI report 830 including the opportunistic CSI sample 832 to the first wireless device 802. The second wireless device 804 may transmit the CSI report 830 via a MAC-CE, as described in connection with 828, 834, and 836 of FIG. 8.

In some examples, the second wireless device 804 may be configured to transmit the CSI report 830 via a MAC-CE at the CSI report transmission occasion when the CSI report 830 includes a threshold quantity of opportunistic CSI samples. For example, if the second wireless device 804 determines that the CSI report 830 includes less than the threshold quantity of opportunistic CSI samples, then the second wireless device 804 may forego transmitting the MAC-CE at the CSI report transmission occasion. The second wireless device 804 may be configured with the threshold quantity of opportunistic CSI samples. For example, the second wireless device 804 may receive the opportunistic CSI configuration 900 of FIG. 9 including the threshold samples quantity information 910.

In some examples, the second wireless device 804 may be configured to transmit the CSI report 830 after detecting a change in a measurement between a first CSI sample and a second CSI sample. For example, the first CSI sample may include a first CQI associated with a beam and the second CSI sample may include a second CQI associated with the beam. In such examples, when the change from the first CQI to the second CQI is greater than a threshold, the second wireless device 804 may detect the occurrence of a report transmission event (e.g., at 824). The second wireless device 804 may then proceed to transmit the CSI report 830. In some examples, the second wireless device 804 may transmit the CSI report 830 via a MAC-CE, such as described in connection with 828, 834, and 836.

In some examples, the second wireless device 804 may be configured to transmit the CSI report 830 after detecting a change in a sidelink synchronization signal block (S-SSB) signal measurement, such as S-SSB RSRP. In such examples, when the second wireless device 804 determines that a change in S-SSB RSRP is greater than a threshold, the second wireless device 804 may detect the occurrence of a report transmission event (e.g., at 824). The second wireless device 804 may then proceed to transmit the CSI report 830. In some examples, the second wireless device 804 may transmit the CSI report 830 via a MAC-CE, such as described in connection with 828, 834, and 836.

In some examples, the second wireless device 804 may be configured to compute opportunistic CSI samples over sidelink communication links that the first wireless device 802 is transmitting. For example, the second wireless device 804 may compute the opportunistic CSI samples regardless of whether the sidelink transmission is directed to a UE included in an identified group of UEs. In some such examples, the second wireless device 804 may include a time-frequency stamp with a respective opportunistic CSI sample. The time-frequency stamp may indicate a time that the respective CSI sample was computed and/or a bandwidth associated with the beam used to transmit the sidelink transmission. The first wireless device 802 may use the time-frequency stamp of an opportunistic CSI sample to determine how to use the opportunistic CSI.

For example, the second sidelink transmission 840 includes a common sidelink CSI-RS 844 that the second wireless device 804 may use to compute an opportunistic CSI sample (e.g., at 822). In such examples, the second wireless device 804 may include a time-frequency stamp with the computed opportunistic CSI sample to indicate a time that the second wireless device 804 received the second sidelink transmission 840 and/or a bandwidth associated with the second sidelink transmission 840.

In some examples, the second wireless device 804 may include the time-frequency stamp with an opportunistic CSI sample when a group of UEs is not defined. For example, if the opportunistic CSI configuration 810 does not include a set of destination identifiers (e.g. the destination identifiers information 906 of FIG. 9), the second wireless device 804 may compute and provide a stamp to each computed opportunistic CSI sample. For example, the second wireless device 804 may compute and provide a stamp to the respective opportunistic CSI samples computed for the sidelink transmission 812 and the second sidelink transmission 840.

In some examples, the second wireless device 804 may be configured to include the time-frequency stamp with an opportunistic CSI sample computed based on a sidelink transmission directed to a non-member of the group of UEs. For example, with respect to the sidelink transmission 812, the second wireless device 804 may compute the opportunistic CSI sample 832 and forego including a time-frequency stamp with the opportunistic CSI sample 832. With respect to the second sidelink transmission 840, the second wireless device 804 may compute an opportunistic CSI sample and include a time-frequency stamp with the respective opportunistic CSI sample.

In some examples, the second wireless device 804 may be configured to include the time-frequency stamp with an opportunistic CSI sample computed based on a sidelink transmission directed to a member of the group of UEs, but for which the first wireless device 802 indicated that the second wireless device 804 is to forego computing the opportunistic CSI sample. For example, the sidelink transmission 812 may include the flag 818 that indicates whether the second wireless device 804 is to compute an opportunistic CSI sample based on the sidelink transmission 812. In some examples, the first wireless device 802 may set the flag 818 to a first value (e.g. a "0") to indicate to the second wireless device 804 not to compute an opportunistic CSI sample. However, the second wireless device 804 may still compute the opportunistic CSI sample (e.g., at 822) and include the time-frequency stamp.

At 852, the first wireless device 802 may use the opportunistic CSI samples included in the CSI report 830. For example, the first wireless device 802 may use the opportunistic CSI sample 832 to check whether the transmit power of the second sidelink transmission 840 is within a manageable range.

Figure 11B:
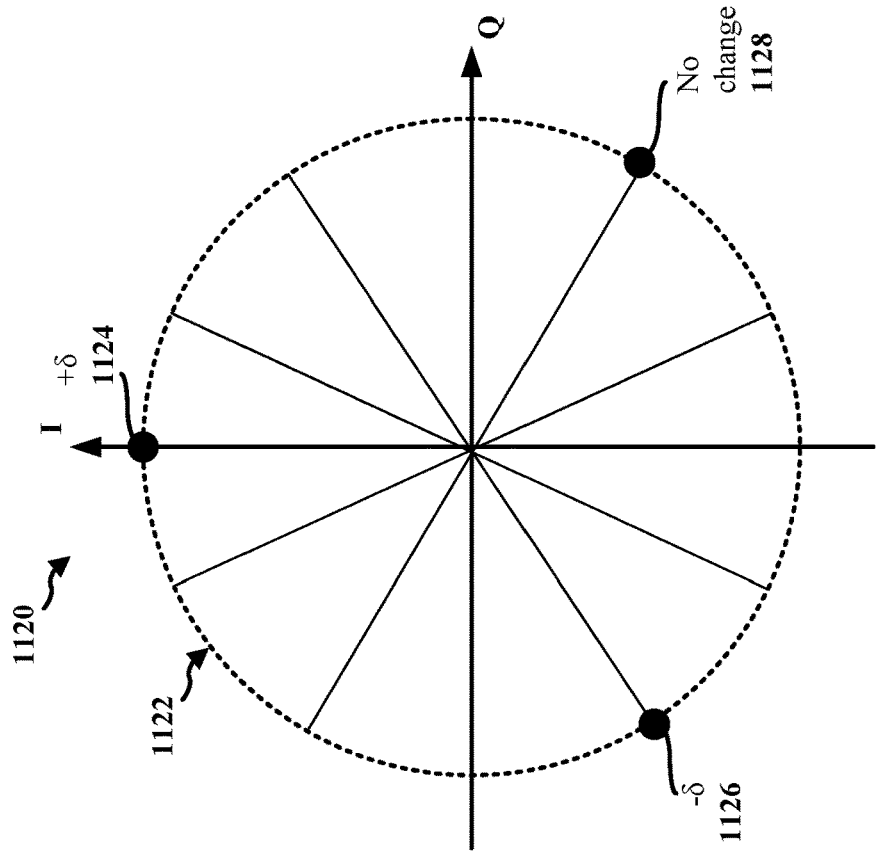
FIG. 11B illustrates an example mapping of three values onto a constellation, in accordance with various aspects of the present disclosure.
Figure 11A:
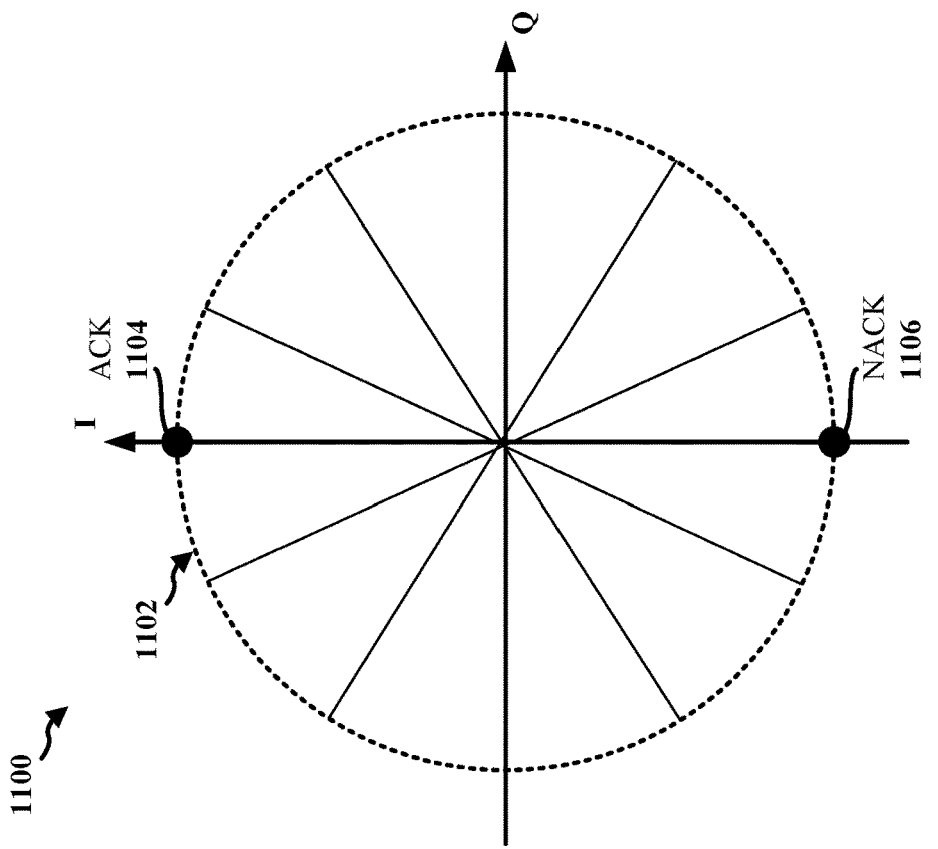
FIG. 11A illustrates an example mapping of two values on to a constellation, in accordance with various aspects of the present disclosure.

In some examples, the first wireless device 802 may configure the second wireless device 804 to transmit the CSI report 830 to the first wireless device 802 using a sidelink feedback channel (e.g., PSFCH). In some examples, the PSFCH may be used to transmit an acknowledgement (ACK) or a negative ACK (NACK). For example, FIG. 11A illustrates an example mapping 1100 of two values on to a constellation 1102, as presented herein. In the example of FIG. 11A, a first value 1104 corresponds to an ACK and a second value 1106 corresponds to a NACK. The first value 1104 and the second value 1106 are positioned on the constellation 1102 so that the respective values may be identified.

In some examples, the first wireless device 802 may configure the second wireless device 804 to transmit one of three values to the first wireless device 802 using a PSFCH. For example, the opportunistic CSI configuration 810 may include information related to a delta CQI (e.g., the delta CQI information 912 and/or the delta CQI thresholds information 914 of FIG. 9). In such examples, the second wireless device 804 may report a change (e.g., delta) in CQI values relative to a previous CQI value. For example, FIG. 11B illustrates an example mapping 1120 of three values onto a constellation 1122, as presented herein. In the example of FIG. 11B, a first value 1124 ("+δ") indicates an increase in CQI relative to a previous CQI value, a second value 1126 ("−δ") indicates a decrease in CQI relative to the previous CQI value, and a third value 1128 ("No change") indicates no change in CQI relative to the previous CQI value. The first value 1124, the second value 1126, and the third value 1128 are positioned on the constellation 1122 so that the respective values may be identified.

In some examples, the responding sidelink UE may encode the delta CQI based on threshold values. For example, the responding sidelink UE may use the first value 1124 when the change in CQI satisfies a first threshold, may use the second value 1126 when the change in CQI satisfies a second threshold, and may use the third value 1128 when the change in CQI fails to satisfy the first threshold and the second threshold. In some examples, satisfying the first threshold may include a change in CQI that is greater than the first threshold or a change in CQI that is greater than or equal to the first threshold. In some examples, satisfying the second threshold may include a change in CQI that is less than the second threshold or a change in CQI that is less than or equal to the second threshold.

Figure 12:
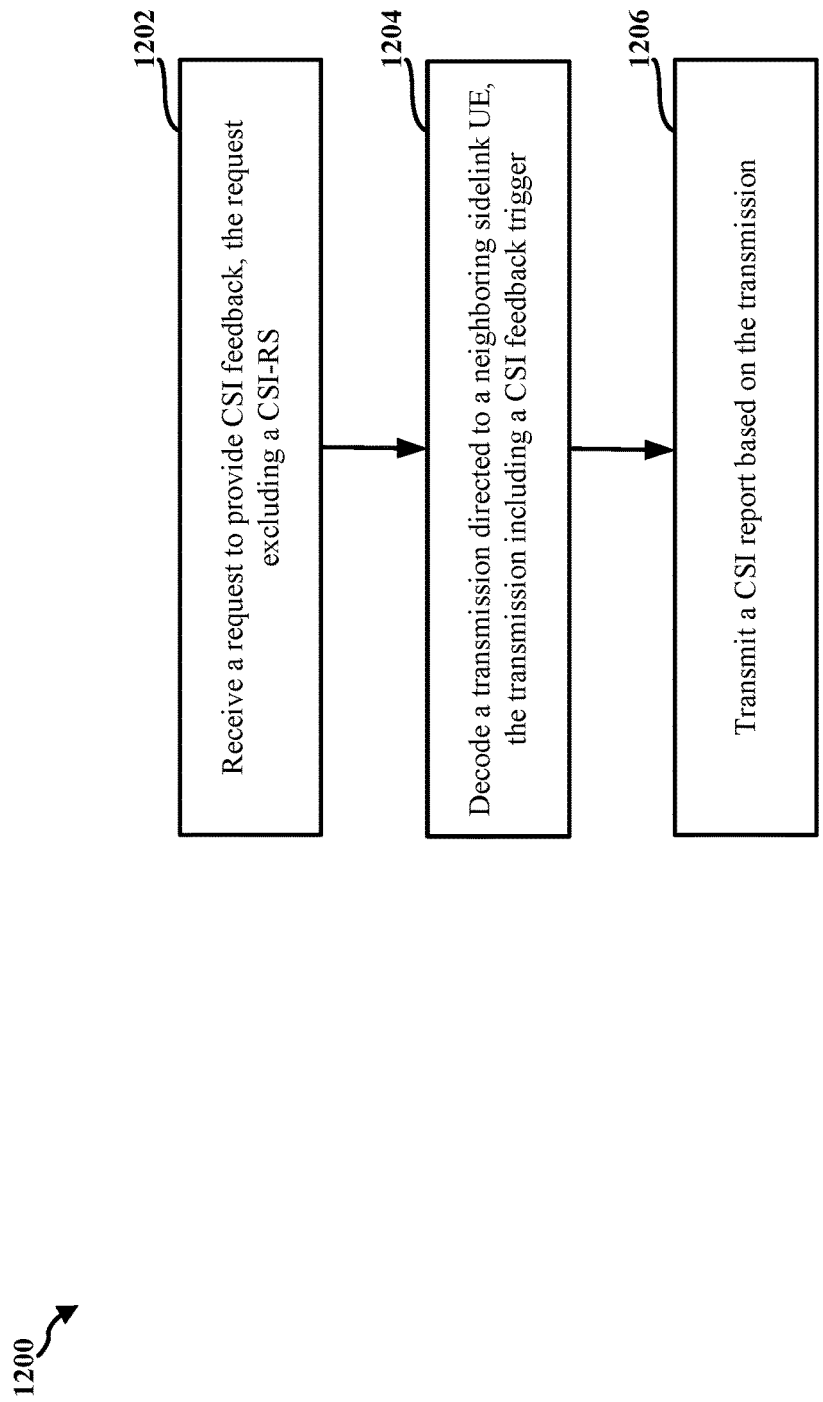
FIG. 12 is a flowchart of a method of wireless communication at a responding sidelink device, in accordance with aspects presented herein.

FIG. 12 is a flowchart 1200 of a method of wireless communication. The method may be performed by a responding sidelink UE (e.g., the UE 104, the second wireless communication device 350, the second wireless device 704 of FIG. 7A, the second UE 724 of FIGS. 7B, 7C, the second wireless device 804 of FIG. 8, and/or an apparatus 1402 of FIG. 14). The method may facilitate increasing data rates and/or increasing spectral efficiency by enabling wideband CSI while communicating via sidelink.

At 1202, the responding sidelink UE receives, from an initiating sidelink UE, a request to provide CSI feedback, the request excluding a CSI-RS, as described in connection with the opportunistic CSI configuration 810 of FIG. 8. The receiving of the request, at 1202, may be performed by a configuration component 1440 of the apparatus 1402 of FIG. 14.

At 1204, the responding sidelink UE decodes a transmission from the initiating sidelink UE to a neighboring sidelink UE, the transmission including a CSI feedback trigger, as described in connection with the sidelink transmission 812 and at 820 of FIG. 8. The decoding of the transmission, at 1204, may be performed by a decode component 1442 of the apparatus 1402 of FIG. 14.

At 1206, the responding sidelink UE transmits, the initiating sidelink UE, a CSI report based on the transmission, as described in connection with the CSI report 830 of FIG. 8. In some examples, the responding sidelink UE may transmit the CSI report via a MAC-CE. In some examples, the responding sidelink UE may transmit the CSI report via a sidelink feedback channel (PSFCH). The transmitting of the CSI report, at 1206, may be performed by a report component 1444 of the apparatus 1402 of FIG. 14.

Figure 13:
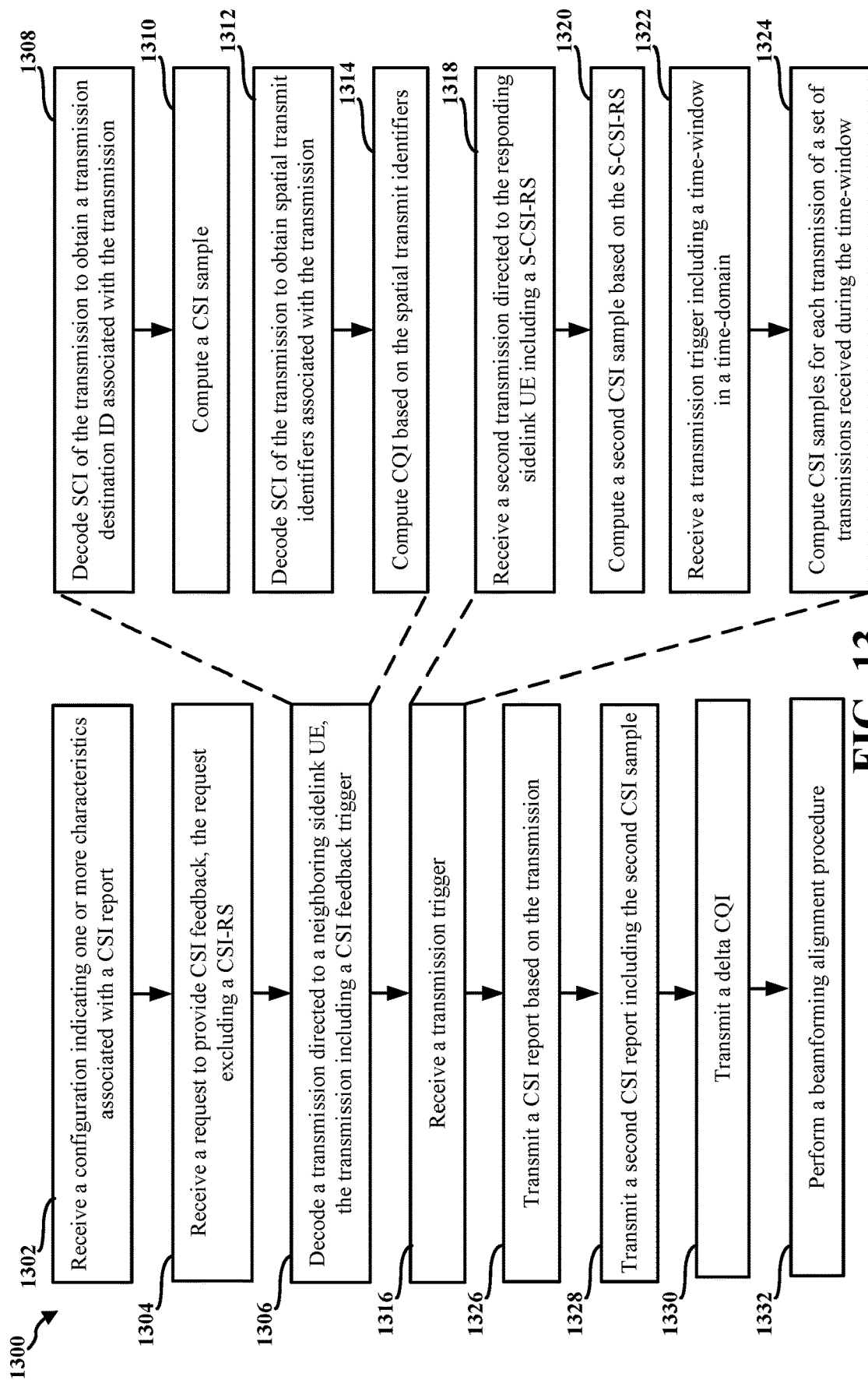
FIG. 13 is a flowchart of another method of wireless communication at a responding sidelink device, in accordance with aspects presented herein.

FIG. 13 is a flowchart 1300 of a method of wireless communication. The method may be performed by a responding sidelink UE (e.g., the UE 104, the second wireless communication device 350, the second wireless device 704 of FIG. 7A, the second UE 724 of FIGS. 7B, 7C, the second wireless device 804 of FIG. 8, and/or an apparatus 1402 of FIG. 14). The method may facilitate increasing data rates and/or increasing spectral efficiency by enabling wideband CSI while communicating via sidelink.

At 1304, the responding sidelink UE receives, from an initiating sidelink UE, a request to provide CSI feedback, the request excluding a CSI-RS, as described in connection with the opportunistic CSI configuration 810 of FIG. 8. The receiving of the request, at 1304, may be performed by a configuration component 1440 of the apparatus 1402 of FIG. 14.

At 1306, the responding sidelink UE decodes a transmission from the initiating sidelink UE to a neighboring sidelink UE, the transmission including a CSI feedback trigger, as described in connection with the sidelink transmission 812 and at 820 of FIG. 8. The decoding of the transmission, at 1306, may be performed by a decode component 1442 of the apparatus 1402 of FIG. 14.

At 1326, the responding sidelink UE transmits, the initiating sidelink UE, a CSI report based on the transmission, as described in connection with the CSI report 830 of FIG. 8. In some examples, the responding sidelink UE may transmit the CSI report via a MAC-CE. In some examples, the responding sidelink UE may transmit the CSI report via a sidelink feedback channel (PSFCH). The transmitting of the CSI report, at 1326, may be performed by a report component 1444 of the apparatus 1402 of FIG. 14.

At 1302, the responding sidelink UE may receive a configuration indicating one or more characteristics associated with the CSI report, as described in connection with the opportunistic CSI configuration 810 of FIG. 8 and/or the opportunistic CSI configuration 900 of FIG. 9. The responding sidelink UE may receive the configuration via Layer 3 signaling. The receiving of the configuration, at 1302, may be performed by the configuration component 1440 of the apparatus 1402 of FIG. 14.

In some examples, the configuration may indicate that the CSI feedback trigger includes one or more of a PSCCH DMRS, a PSSCH DMRS, and a sidelink CSI-RS, as described in connection with CSI feedback trigger information 902 of FIG. 9.

In some examples, the configuration may indicate a set of destination identifiers associated with a group of UEs, the group of UEs including at least the responding sidelink UE and the neighboring sidelink UE, as described in connection with the destination identifiers information 906 of FIG. 9.

In some examples, the responding sidelink UE may compute opportunistic CSI samples based on the set of destination identifiers. For example, at 1308, the responding sidelink UE may decode SCI of the transmission to obtain a transmission destination identifier associated with the transmission, as described in connection with the transmission destination identifier 814 and/or at 820 of FIG. 8. The decoding of the SCI, at 1308, may be performed by an SCI component 1446 of the apparatus 1402 of FIG. 14.

At 1310, the responding sidelink UE may compute a CSI sample based on the transmission when the set of destination identifiers includes the transmission destination ID, as described in connection with 822 of FIG. 8 and the destination identifiers information 906 of FIG. 9. The computing of the CSI sample, at 1310, may be performed by a sample compute component 1448 of the apparatus 1402 of FIG. 14.

In some examples, the SCI may include a value indicating to the responding sidelink UE to compute the CSI sample based on the transmission, as described in connection with the flag 818 of FIG. 8.

In some examples, the responding sidelink UE may receive a trigger that causes the responding sidelink UE to transmit the CSI report. For example, at 1316, the responding sidelink UE may receive a transmission trigger from the initiating sidelink UE, as described in connection with the transmission trigger 826 of FIG. 8. The receiving of the transmission trigger, at 1316, may be performed by a trigger component 1450 of the apparatus 1402 of FIG. 14.

In some examples, the transmission trigger may indicate to the responding sidelink UE to transmit the CSI report including one or more opportunistic CSI samples computed during a previous time-window, as described in connection with the transmission trigger 1010 of FIG. 10A.

In some examples, the responding sidelink UE may receive the transmission trigger and a sidelink CSI-RS directed to the responding sidelink UE. For example, at 1318, the responding sidelink UE may receive, from the initiating sidelink UE, a second transmission directed to the responding sidelink UE, the second transmission including the transmission trigger and a sidelink CSI-RS, as described in connection with the example transmission trigger 1030 of FIG. 10B. The receiving of the second transmission, at 1318, may be performed by the decode component 1442 of the apparatus 1402 of FIG. 14.

At 1320, the responding sidelink UE may compute a second CSI sample based on the sidelink CSI-RS, as described in connection with the CSI sample based on the transmission trigger 1030 of the CSI report 1032 of FIG. 10B. The computing of the second CSI sample, at 1320, may be performed by the sample compute component 1448 of the apparatus 1402 of FIG. 14.

At 1328, the responding sidelink UE may transmit a second CSI report including the second CSI sample, as described in connection with the CSI report 1032 of FIG. 10B. In some examples, the CSI report and the second CSI report may be transmitted in a same MAC-CE. In some examples, the second CSI report may include narrowband CSI based on the second transmission, and the CSI report may include additional CSI based on sub-channels associated with transmission of the set of transmissions. The transmitting of the second CSI report, at 1328, may be performed by the report component 1444 of the apparatus 1402 of FIG. 14.

In some examples, the trigger may indicate an upcoming time-window. For example, at 1322, the responding sidelink UE may receive a transmission trigger indicating a time-window in a time-domain, the time-window occurring after receiving the transmission trigger in the time-domain, as described in connection with the transmission trigger 1042 of FIG. 10C. The receiving of the transmission trigger indicating the time-window, at 1322, may be performed by the trigger component 1450 of the apparatus 1402 of FIG. 14.

At 1324, the responding sidelink UE may compute CSI samples for each transmission of a set of transmissions that is associated with a transmission destination identifier included in the set of destination identifiers, the set of transmissions decoded during the time-window, as described in connection with the example 1040 of FIG. 10C. The computing of the CSI samples for each transmission of the set of transmissions, at 1324, may be performed by the sample compute component 1448 of the apparatus 1402 of FIG. 14. The responding sidelink UE may then transmit the CSI report (e.g., at a 1326) after the time-window expires, the CSI report including the CSI samples, as described in connection with the CSI report 1044 of FIG. 10C.

In some examples, the responding sidelink UE may periodically transmit the CSI report (e.g., at 1326). In some examples, the configuration (e.g., at 1302) may indicate a threshold samples quantity, as described in connection with the threshold samples quantity information 910 of FIG. 9. In some such examples, the responding sidelink UE may transmit the CSI report via a MAC-CE when the CSI report includes at least a threshold quantity of CSI samples.

In some examples, the responding sidelink UE may transmit the CSI report (e.g., at 1326) based on an occurrence of a report transmission event. For example, the configuration (e.g., at 1302) may indicate a CSI-triggering event, such as a CSI report transmission occasion, a reception of a transmission trigger, and/or a change in a CSI report property. In such examples, the responding sidelink UE may transmit the CSI report via a MAC-CE based on an occurrence of the CSI-triggering event.

For example, the CSI-triggering event may include a threshold change in a property of the CSI report and a second CSI report. In some examples, the property may include a CQI associated with a beam, as described in connection with 824 of FIG. 8. In some examples, the property may include a S-SSB signal measurement, such as S-SSB RSRP, as described in connection with 824 of FIG. 8.

In some examples, the configuration (e.g., at 1302) may configure the responding sidelink UE to transmit a time-frequency stamp with the CSI report, as described in connection with 822 of FIG. 8. For example, the responding sidelink UE may include a time-frequency stamp with the CSI report when a transmission destination identifier associated with the transmission is excluded from a set of destination identifiers (e.g., the transmission is directed to a non-member of the group of UEs). In some examples, the responding sidelink UE may include the time-frequency stamp with each CSI report including an opportunistic CSI sample.

In some examples, the configuration (e.g., at 1302) may configure the responding sidelink UE to transmit a delta CQI via a sidelink feedback channel, as described in connection with the example of FIG. 11. For example, the responding sidelink UE may encode the delta CQI with a first value when the delta CQI is greater than a first threshold (e.g., the first value 1124 of FIG. 11B), may encode the delta CQI with a second value when the delta CQI is less than or equal to the first threshold and greater than a second threshold (e.g., the third value 1128 of FIG. 11B), and may encode the delta CQI with a third value when the delta CQI is less than or equal to the second threshold (e.g., the second value 1126 of FIG. 11B).

At 1330, the responding sidelink UE may transmit the delta CQI, as described in connection with the example of FIG. 11B. The transmitting of the delta CQI, at 1330, may be performed by a CQI component 1452 of the apparatus 1402 of FIG. 14.

In some examples, the responding sidelink UE may be configured to obtain spatial transmit identifiers associated with transmissions directed to neighboring sidelink UEs. For example, at 1312, the responding sidelink UE may decode SCI of the transmission to obtain spatial transmit identifiers associated with the transmission, as described in connection with 820 of FIG. 8 and/or the communication environment 740 of FIG. 7C. Examples of spatial transmit identifiers may include a rank indicator, PMI/TPMI, and/or TCI. The decoding of the SCI of the transmission to obtain spatial transmit identifiers associated with the transmission, at 1312, may be performed by the SCI component 1446 of the apparatus 1402 of FIG. 14.

At 1314, the responding sidelink UE may compute CSI including CQI based on the spatial transmit identifiers, as described in connection with the first opportunistic CSI sample 746a and/or the second opportunistic CSI sample 746b of FIG. 7C. The computing of the CSI including CQI based on the spatial transmit identifiers, at 1314, may be performed by the CQI component 1452 of the apparatus 1402 of FIG. 14. The CSI report (e.g., at 1326) may include an indicator that the CQI is linked to the spatial transmit identifiers, as described in connection with the CSI report 746 of FIG. 7C.

At 1332, the responding sidelink UE may perform a beamforming alignment procedure based at least in part on the spatial transmit identifiers linked to the CQI, as described in connection with the examples of FIGS. 6A, 6B, and 6C. The performing of the beamforming alignment procedure, at 1332, may be performed by a beamforming component 1454 of the apparatus 1402 of FIG. 14.

Figure 14:
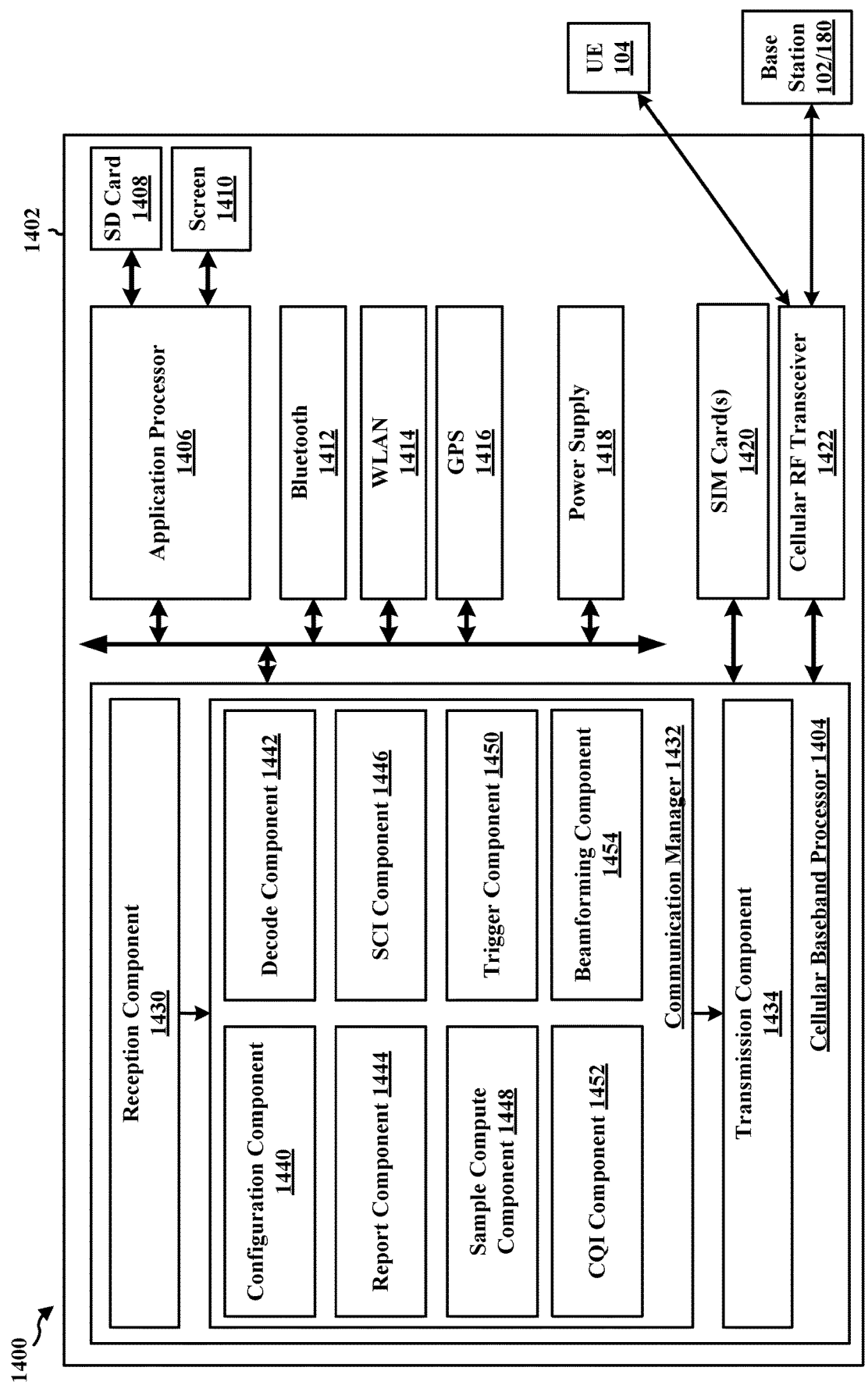
FIG. 14 is a diagram illustrating an example of a hardware implementation for an example apparatus, in accordance with aspects presented herein.

FIG. 14 is a diagram 1400 illustrating an example of a hardware implementation for an apparatus 1402. The apparatus 1402 may be a UE, or another device configured to transmit and/or receive sidelink communication. The apparatus 1402 includes a baseband processor 1404 (also referred to as a modem) coupled to a RF transceiver 1422. In some aspects, the baseband processor 1404 may be a cellular baseband processor and/or the RF transceiver 1422 may be a cellular RF transceiver. The apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The baseband processor 1404 communicates through the RF transceiver 1422 with the UE 104 and/or the base station 102/180. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described in the present application. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the second wireless communication device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see the second wireless communication device 350 of FIG. 3) and include the additional modules of the apparatus 1402.

The communication manager 1432 includes a configuration component 1440 that is configured to receive a request to provide CSI feedback, the request excluding a CSI-RS, for example, as described in connection with 1202 of FIG. 12 and/or 1304 of FIG. 13. The example configuration component 1440 may also be configured to receive a configuration indicating one or more characteristics associated with a CSI report, for example, as described in connection with 1302 of FIG. 13.

The communication manager 1432 also includes a decode component 1442 that is configured to decode a transmission directed to a neighboring sidelink UE, the transmission including a CSI feedback trigger, for example, as described in connection with 1204 of FIG. 12 and/or 1306 of FIG. 13. The example decode component 1442 may also be configured to receive a second transmission directed to the responding sidelink UE including a S-CSI-RS, for example, as described in connection with 1318 of FIG. 13.

The communication manager 1432 also includes a report component 1444 that is configured to transmit a CSI report based on the transmission, for example, as described in connection with 1206 of FIG. 12 and/or 1326 of FIG. 13. The example report component 1444 may also be configured to transmit a second CSI report including the second CSI sample, for example, as described in connection with 1328 of FIG. 13.

The communication manager 1432 also includes an SCI component 1446 that is configured to decode SCI of the transmission to obtain a transmission destination ID associated with the transmission, for example, as described in connection with 1308 of FIG. 13. The example SCI component 1446 may also be configured to decode SCI of the transmission to obtain spatial transmit identifiers associated with the transmission, for example, as described in connection with 1312 of FIG. 13.

The communication manager 1432 also includes a sample compute component 1448 that is configured to compute a CSI sample, for example, as described in connection with 1310 of FIG. 13. The example sample compute component 1448 may also be configured to compute a second CSI sample based on the S-CSI-RS, for example, as described in connection with 1320 of FIG. 13. The example sample compute component 1448 may also be configured to compute CSI samples for each transmission of a set of transmissions received during the time-window, for example, as described in connection with 1324 of FIG. 13.

The communication manager 1432 also includes a trigger component 1450 that is configured to receive a transmission trigger, for example, as described in connection with 1316 of FIG. 13. The example trigger component 1450 may also be configured to receive a transmission trigger including a time-window in a time-domain, for example, as described in connection with 1322 of FIG. 13.

The communication manager 1432 also includes a CQI component 1452 that is configured to transmit a delta CQI, for example, as described in connection with 1330 of FIG. 13. The example CQI component 1452 may also be configured to compute CQI based on the spatial transmit identifiers, for example, as described in connection with 1314 of FIG. 13.

The communication manager 1432 also includes a beamforming component 1454 that is configured to perform a beamforming alignment procedure, for example, as described in connection with 1332 of FIG. 13.

The apparatus may include additional components that perform each of the blocks of the algorithm in the flowcharts of FIGS. 12 and/or 13. As such, each block in the flowcharts of FIGS. 12 and/or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband processor 1404, includes means for receiving, from an initiating sidelink UE, a request to provide CSI feedback to the initiating sidelink UE, the request excluding a CSI-RS. The example apparatus 1402 also includes means for decoding a transmission from the initiating sidelink UE to a neighboring sidelink UE, the transmission including a CSI feedback trigger. The example apparatus 1402 also includes means for transmitting, to the initiating sidelink UE, a CSI report based on the transmission.

In another configuration, the example apparatus 1402 also includes means for receiving a configuration indicating one or more characteristics associated with the CSI report.

In another configuration, the example apparatus 1402 also includes means for receiving the configuration via Layer 3 signaling.

In another configuration, the example apparatus 1402 also includes means for decoding SCI of the transmission to obtain a transmission destination ID associated with the transmission. The example apparatus 1402 also includes means for computing a CSI sample based on the transmission when the set of destination IDs includes the transmission destination ID. The example apparatus 1402 also includes means for computing the CSI sample based on the transmission.

In another configuration, the example apparatus 1402 also includes means for receiving a transmission trigger from the initiating sidelink UE. The example apparatus 1402 also includes means for receiving, from the initiating sidelink UE, a second transmission directed to the responding sidelink UE, the second transmission including the transmission trigger and a sidelink CSI-RS. The example apparatus 1402 also includes means for computing a second CSI sample based on the sidelink CSI-RS. The example apparatus 1402 also includes means for transmitting a second CSI report including the second CSI sample.

In another configuration, the example apparatus 1402 also includes means for receiving a transmission trigger indicating a time-window in a time-domain, the time-window occurring after receiving the transmission trigger in the time-domain. The example apparatus 1402 also includes means for computing CSI samples for each transmission of a set of transmissions that is associated with a transmission destination ID included in the set of destination IDs, the set of transmissions decoded during the time-window, where the responding sidelink UE transmits the CSI report after the time-window expires, the CSI report including the CSI samples.

In another configuration, the example apparatus 1402 also includes means for periodically transmitting the CSI report via a MAC-CE. The example apparatus 1402 also includes means for transmitting the MAC-CE when the CSI report includes at least the threshold samples quantity.

In another configuration, the example apparatus 1402 also includes means for transmitting the CSI report via a MAC-CE based on an occurrence of the CSI-triggering event.

In another configuration, the example apparatus 1402 also includes means for transmitting a time-frequency stamp with the CSI report. The example apparatus 1402 also includes means for transmitting the time-frequency stamp with the CSI report when the set of destination IDs excludes a transmission destination ID associated with the transmission.

In another configuration, the example apparatus 1402 also includes means for transmitting a delta CQI via a sidelink feedback channel. The example apparatus 1402 also includes means for encoding the delta CQI with: a first value when the delta CQI is greater than a first threshold, a second value when the delta CQI is less than or equal to the first threshold and greater than a second threshold, or a third value when the delta CQI is less than or equal to the second threshold.

In another configuration, the example apparatus 1402 also includes means for decoding sidelink control information of the transmission to obtain spatial transmit identifiers associated with the transmission. The example apparatus 1402 also includes means for computing CSI including CQI based on the spatial transmit identifiers, the CSI report including an indicator that the CQI is linked to the spatial transmit identifiers. The example apparatus 1402 also includes means for performing, with the initiating sidelink UE, a beamforming alignment procedure based at least in part on the spatial transmit identifiers linked to the CQI.

The means may be one or more of the components of the apparatus 1402 configured to perform the functions recited by the means. As described supra, the apparatus 1402 may include the TX processor 368, the RX processor 356, and the controller/processor 359. As such, in one configuration, the means may be the TX processor 368, the RX processor 356, and the controller/processor 359 configured to perform the functions recited by the means.

Figure 15:
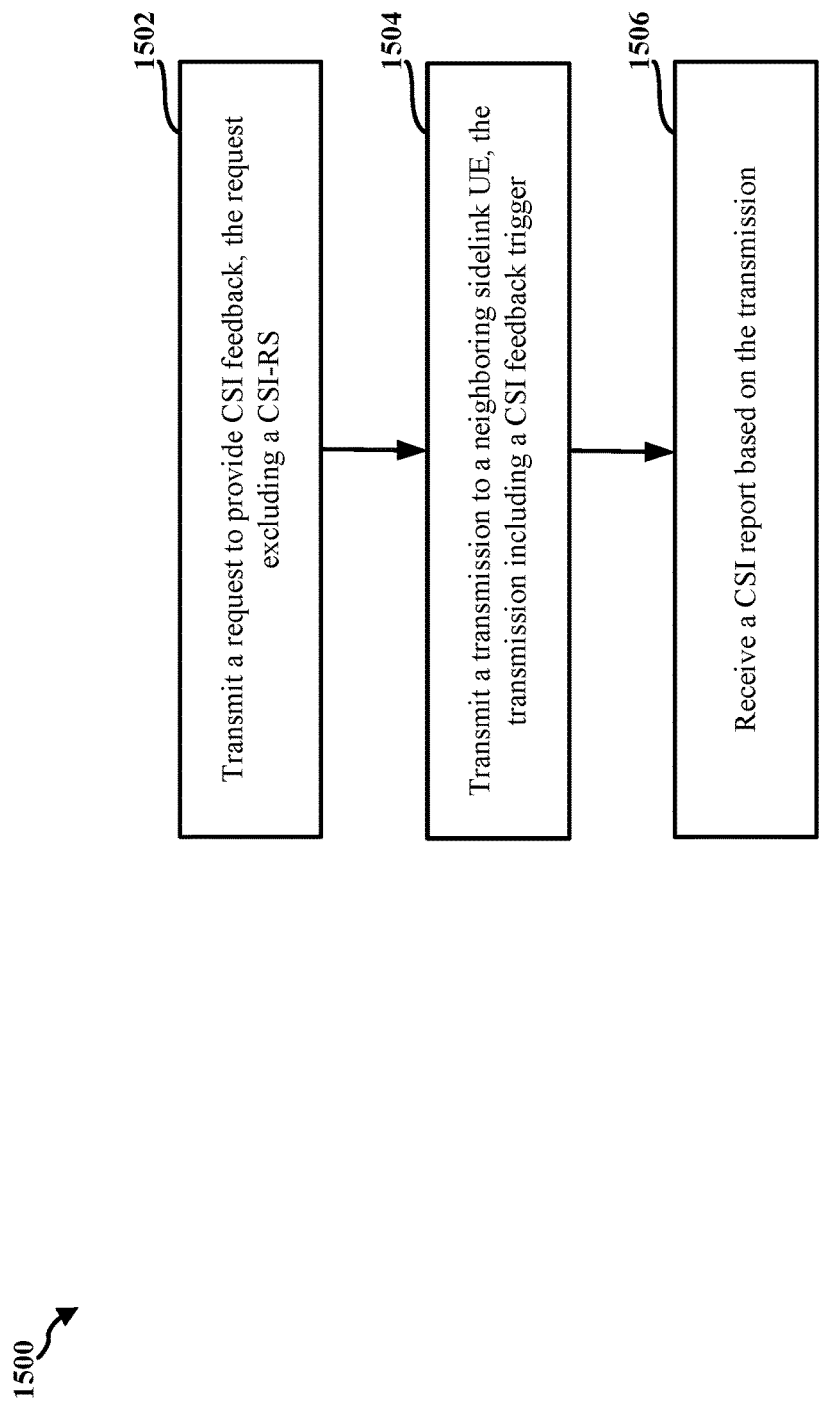
FIG. 15 is a flowchart of a method of wireless communication at an initiating sidelink device, in accordance with aspects presented herein.

FIG. 15 is a flowchart 1500 of a method of wireless communication. The method may be performed by an initiating sidelink UE (e.g., the UE 104, the first wireless communication device 310, the first wireless device 702 of FIG. 7A, the first UE 722 of FIGS. 7B, 7C, the first wireless device 802 of FIG. 8, and/or an apparatus 1702 of FIG. 17). The method may facilitate increasing data rates and/or increasing spectral efficiency by enabling wideband CSI while communicating via sidelink.

At 1502, the initiating sidelink UE transmits, to a responding sidelink UE, a request to provide CSI feedback, the request excluding a CSI-RS, as described in connection with the opportunistic CSI configuration 810 of FIG. 8. The transmitting of the request, at 1502, may be performed by a configuration component 1740 of the apparatus 1702 of FIG. 17.

At 1504, the initiating sidelink UE transmits a transmission to a neighboring sidelink UE, the transmission including a CSI feedback trigger, as described in connection with the sidelink transmission 812 of FIG. 8. The transmitting of the transmission to the neighboring sidelink UE, at 1504, may be performed by a sidelink transmission component 1742 of the apparatus 1702 of FIG. 17.

At 1506, the initiating sidelink UE receives, from the responding sidelink UE, a CSI report based on the transmission, as described in connection with the CSI report 830 of FIG. 8. In some examples, the initiating sidelink UE may receive the CSI report via a MAC-CE. In some examples, the initiating sidelink UE may receive the CSI report via a sidelink feedback channel (PSFCH). The receiving of the CSI report, at 1506, may be performed by a report component 1744 of the apparatus 1702 of FIG. 17.

Figure 16:
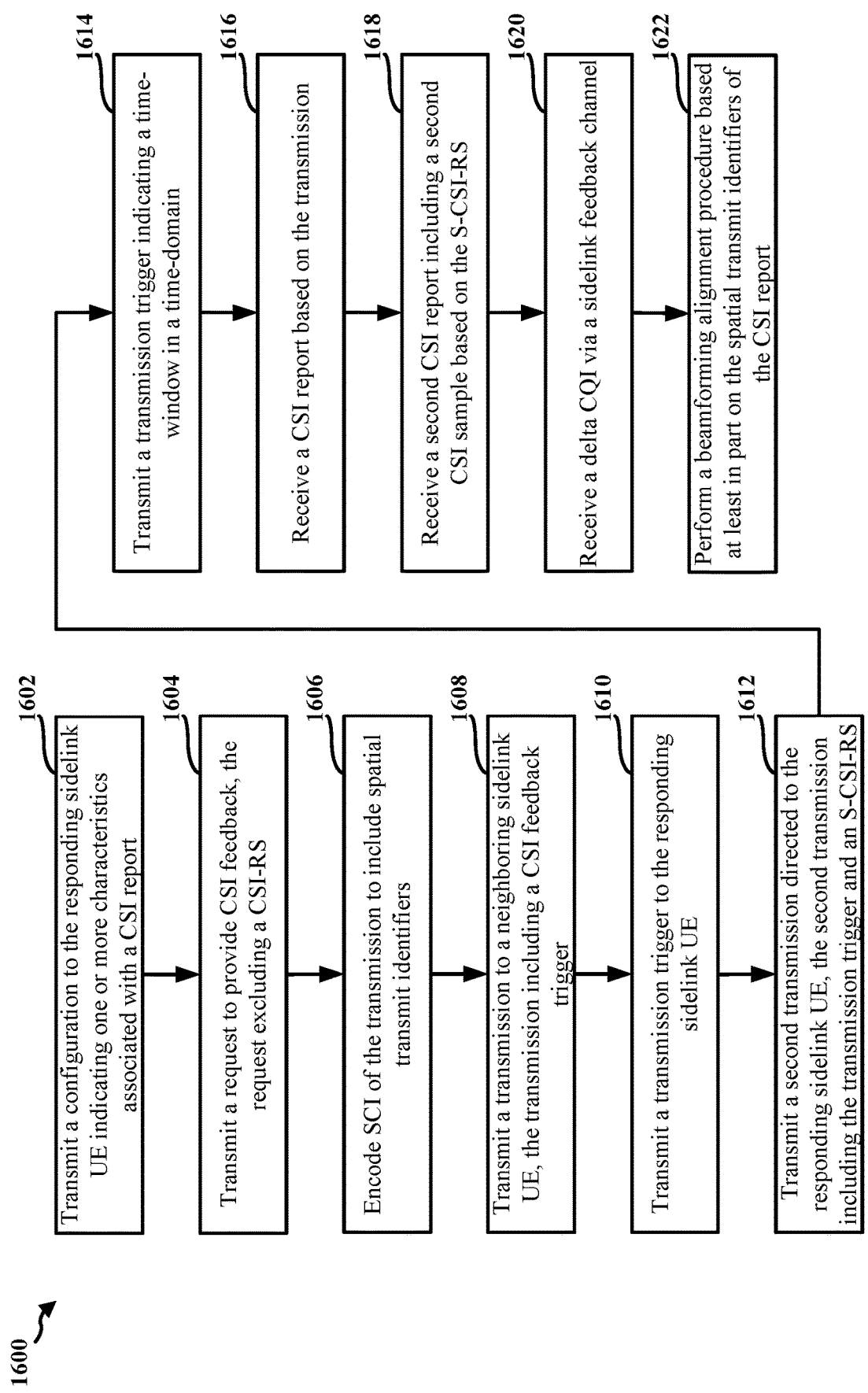
FIG. 16 is a flowchart of another method of wireless communication at an initiating sidelink device, in accordance with aspects presented herein.

FIG. 16 is a flowchart 1600 of a method of wireless communication. The method may be performed by an initiating sidelink UE (e.g., the UE 104, the first wireless communication device 310, the first wireless device 702 of FIG. 7A, the first UE 722 of FIGS. 7B, 7C, the first wireless device 802 of FIG. 8, and/or an apparatus 1702 of FIG. 17). The method may facilitate increasing data rates and/or increasing spectral efficiency by enabling wideband CSI while communicating via sidelink.

At 1604, the initiating sidelink UE transmits, to a responding sidelink UE, a request to provide CSI feedback, the request excluding a CSI-RS, as described in connection with the opportunistic CSI configuration 810 of FIG. 8. The transmitting of the request, at 1604, may be performed by a configuration component 1740 of the apparatus 1702 of FIG. 17.

At 1608, the initiating sidelink UE transmits a transmission to a neighboring sidelink UE, the transmission including a CSI feedback trigger, as described in connection with the sidelink transmission 812 of FIG. 8. The transmitting of the transmission to the neighboring sidelink UE, at 1608, may be performed by a sidelink transmission component 1742 of the apparatus 1702 of FIG. 17.

At 1616, the initiating sidelink UE receives, from the responding sidelink UE, a CSI report based on the transmission, as described in connection with the CSI report 830 of FIG. 8. In some examples, the initiating sidelink UE may receive the CSI report via a MAC-CE. In some examples, the initiating sidelink UE may receive the CSI report via a sidelink feedback channel (PSFCH). The receiving of the CSI report, at 1616, may be performed by a report component 1744 of the apparatus 1702 of FIG. 17.

At 1602, the initiating sidelink UE may transmit a configuration to the responding sidelink UE indicating one or more characteristics associated with the CSI report, as described in connection with the opportunistic CSI configuration 810 of FIG. 8 and/or the opportunistic CSI configuration 900 of FIG. 9. The initiating sidelink UE may transmit the configuration via Layer 3 signaling. The transmitting of the configuration, at 1602, may be performed by the configuration component 1740 of the apparatus 1702 of FIG. 17.

In some examples, the configuration may indicate that the CSI feedback trigger includes one or more of a PSCCH DMRS, a PSSCH DMRS, and a sidelink CSI-RS, as described in connection with CSI feedback trigger information 902 of FIG. 9.

In some examples, the configuration may indicate a set of destination identifiers associated with a group of UEs, the group of UEs including at least the responding sidelink UE and the neighboring sidelink UE, as described in connection with the destination identifiers information 906 of FIG. 9. In some examples, the initiating sidelink UE may encode SCI of the transmission to include a transmission destination ID associated with the neighboring sidelink UE, the set of destination IDs including the transmission destination ID, as described in connection with the transmission destination identifier 814 of FIG. 8. In some examples, the initiating sidelink UE may transmit sidelink transmission to members of the group of UEs using a same transmit power. In some examples, the SCI may include a value indicating to the responding sidelink UE to compute the CSI sample based on the transmission, as described in connection with the flag 818 of FIG. 8.

In some examples, the initiating sidelink UE may transmit a trigger that causes the responding sidelink UE to transmit the CSI report. For example, at 1610, the initiating sidelink UE may transmit a transmission trigger to the responding sidelink UE, as described in connection with the transmission trigger 826 of FIG. 8. The transmitting of the transmission trigger, at 1610, may be performed by a trigger component 1746 of the apparatus 1702 of FIG. 17.

In some examples, the transmission trigger may indicate to the responding sidelink UE to transmit the CSI report including one or more opportunistic CSI samples computed during a previous time-window, as described in connection with the transmission trigger 1010 of FIG. 10A.

In some examples, the initiating sidelink UE may transit the transmission trigger and a sidelink CSI-RS directed to the responding sidelink UE. For example, at 1612, the initiating sidelink UE may transmit a second transmission directed to the responding sidelink UE, the second transmission including the transmission trigger and a sidelink CSI-RS, as described in connection with the example transmission trigger 1030 of FIG. 10B. The transmitting of the second transmission, at 1612, may be performed by the sidelink transmission component 1742 of the apparatus 1702 of FIG. 17.

At 1618, the initiating sidelink UE may receive a second CSI report including a second CSI sample based on the sidelink CSI-RS of the second transmission, as described in connection with the CSI report 1032 of FIG. 10B. In some examples, the CSI report and the second CSI report may be received in a same MAC-CE. In some examples, the second CSI report may include narrowband CSI based on the second transmission, and the CSI report may include additional CSI based on sub-channels associated with transmission of the set of transmissions.

Figure 17:
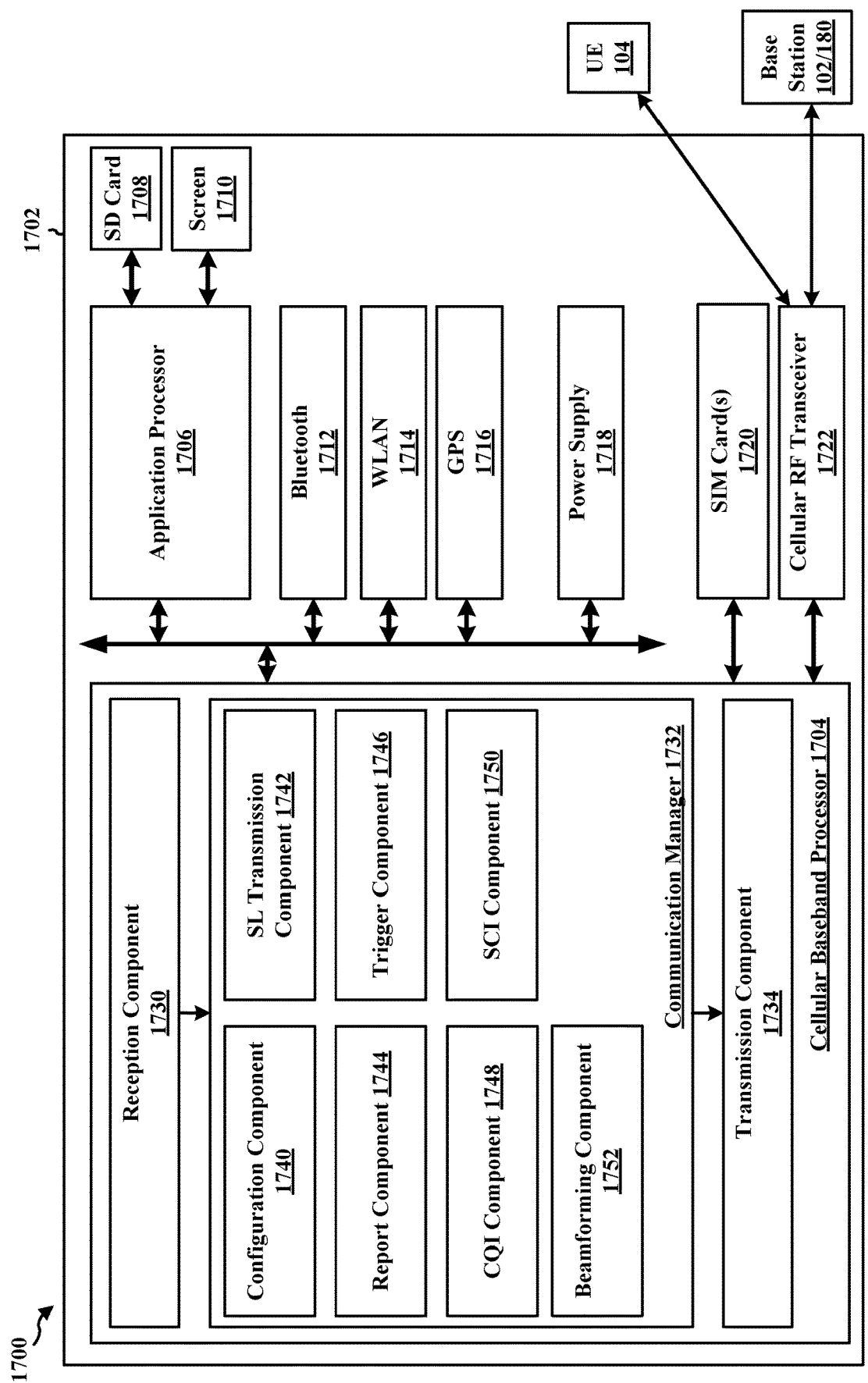
FIG. 17 is a diagram illustrating an example of a hardware implementation for an example apparatus.

The receiving of the second CSI report, at 1618, may be performed by the report component 1744 of the apparatus 1702 of FIG. 17.

In some examples, the trigger may indicate an upcoming time-window. For example, at 1614, the initiating sidelink UE may transmit a transmission trigger indicating a time-window in a time-domain, the time-window occurring after transmitting the transmission trigger in the time-domain, as described in connection with the transmission trigger 1042 of FIG. 10C. The transmitting of the transmission trigger indicating the time-window, at 1614, may be performed by the trigger component 1746 of the apparatus 1702 of FIG. 17.

The initiating sidelink UE may receive the CSI report (e.g., at 1616) after the time-window expires. The CSI report may include CSI samples for each transmission of a set of transmissions that is associated with a transmission destination ID included in the set of destination IDs, the set of transmissions transmitted during the time-window In some examples, the initiating sidelink UE may periodically receive the CSI report (e.g., at 1616). In some examples, the configuration (e.g., at 1602) may indicate a threshold samples quantity, as described in connection with the threshold samples quantity information 910 of FIG. 9. In some such examples, the CSI report may include at least the threshold samples quantity.

In some examples, the initiating sidelink UE may receive the CSI report (e.g., at 1616) based on an occurrence of a report transmission event. For example, the configuration (e.g., at 1602) may indicate a CSI-triggering event, such as a CSI report transmission occasion, a reception of a transmission trigger, and/or a change in a CSI report property. In such examples, the initiating sidelink UE may receive the CSI report via a MAC-CE based on an occurrence of the CSI-triggering event.

For example, the CSI-triggering event may include a threshold change in a property of the CSI report and a second CSI report. In some examples, the property may include a CQI associated with a beam, as described in connection with 824 of FIG. 8. In some examples, the property may include a S-SSB signal measurement, such as S-SSB RSRP, as described in connection with 824 of FIG. 8.

In some examples, the configuration (e.g., at 1602) may configure the responding sidelink UE to transmit a time-frequency stamp with the CSI report, as described in connection with 822 of FIG. 8. For example, the CSI report may include a time-frequency stamp when a transmission destination identifier associated with the transmission is excluded from a set of destination identifiers (e.g., the transmission is directed to a non-member of the group of UEs). In some examples, each CSI report including an opportunistic CSI sample may include the time-frequency stamp.

In some examples, the configuration (e.g., at 1602) may configure the responding sidelink UE to transmit a delta CQI via a sidelink feedback channel, as described in connection with the example of FIG. 11. For example, at 1620, the initiating sidelink UE may receive a delta CQI via a sidelink feedback channel (PSFCH), as described in connection with the example of FIG. 11B. The delta CQI may be encoded using a first value when the delta CQI is greater than a first threshold (e.g., the first value 1124 of FIG. 11B), may be encoded using a second value when the delta CQI is less than or equal to the first threshold and greater than a second threshold (e.g., the third value 1128 of FIG. 11B), and may be encoded with a third value when the delta CQI is less than or equal to the second threshold (e.g., the second value 1126 of FIG. 11B). The receiving of the delta CQI, at 1620, may be performed by a CQI component 1748 of the apparatus 1702 of FIG. 17.

In some examples, the initiating sidelink UE may configure the responding sidelink UE to provide spatial transmit identifiers associated with transmissions directed to neighboring sidelink UEs. For example, at 1606, the initiating sidelink UE may encode SCI of the transmission to include spatial transmit identifiers associated with the transmission, as described in connection with 820 of FIG. 8 and/or the communication environment 740 of FIG. 7C. Examples of spatial transmit identifiers may include a rank indicator, PMI/TPMI, and/or TCI. The encoding of the SCI to include spatial transmit identifiers, at 1606, may be performed by an SCI component 1750 of the apparatus 1702 of FIG. 17.

In some such examples, the CSI report (e.g., at 1616) may include CQI based on the spatial transmit identifiers, the CSI report including an indicator that the CQI is linked to the spatial transmit identifiers, as described in connection with the first opportunistic CSI sample 746a and/or the second opportunistic CSI sample 746b of the CSI report 746 of FIG. 7C.

At 1622, the initiating sidelink UE may perform a beamforming alignment procedure based at least in part on the spatial transmit identifiers linked to the CQI, as described in connection with the examples of FIGS. 6A, 6B, and 6C. The performing of the beamforming alignment procedure, at 1622, may be performed by a beamforming component 1752 of the apparatus 1702 of FIG. 17.

FIG. 17 is a diagram 1700 illustrating an example of a hardware implementation for an apparatus 1702. The apparatus 1702 may be a UE, or another device configured to transmit and/or receive sidelink communication. The apparatus 1702 includes a baseband processor 1704 (also referred to as a modem) coupled to a RF transceiver 1722. In some aspects, the baseband processor 1704 may be a cellular baseband processor and/or the RF transceiver 1722 may be a cellular RF transceiver. The apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. The baseband processor 1704 communicates through the RF transceiver 1722 with the UE 104 and/or the base station 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described in the present application. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the first wireless communication device 310 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see the first wireless communication device 310 of FIG. 3) and include the additional modules of the apparatus 1702.

The communication manager 1732 includes a configuration component 1740 that is configured to transmit a request to provide CSI feedback, the request excluding a CSI-RS, for example, as described in connection with 1502 of FIG. 15 and/or 1604 of FIG. 16. The example configuration component 1740 may also be configured to transmit a configuration to the responding sidelink UE indicating one or more characteristics associated with a CSI report, for example, as described in connection with 1602 of FIG. 16.

The communication manager 1732 also includes a sidelink transmission component 1742 that is configured to transmit a transmission to a neighboring sidelink UE, the transmission including a CSI feedback trigger, for example, as described in connection with 1504 of FIG. 15 and/or 1608 of FIG. 16. The example sidelink transmission component 1742 may also be configured to transmit a second transmission directed to the responding sidelink UE, the second transmission including the transmission trigger and an S-CSI-RS, for example, as described in connection with 1612 of FIG. 16.

The communication manager 1732 also includes a report component 1744 that is configured to receive a CSI report based on the transmission, for example, as described in connection with 1506 of FIG. 15 and/or 1616 of FIG. 16. The example report component 1744 may also be configured to receive a second CSI report including a second CSI sample based on the S-CSI-RS, for example, as described in connection with 1618 of FIG. 16.

The communication manager 1732 also includes a trigger component 1746 that is configured to transmit a transmission trigger to the responding sidelink UE, for example, as described in connection with 1610 of FIG. 16. The example trigger component 1746 may also be configured to transmit a transmission trigger indicating a time-window in a time-domain, for example, as described in connection with 1614 of FIG. 16.

The communication manager 1732 also includes a CQI component 1748 that is configured to receive a delta CQI via a sidelink feedback channel, for example, as described in connection with 1620 of FIG. 16.

The communication manager 1732 also includes an SCI component 1750 that is configured to encode SCI of the transmission to include spatial transmit identifiers, for example, as described in connection with 1606 of FIG. 16.

The communication manager 1732 also includes a beamforming component 1752 that is configured to perform a beamforming alignment procedure based at least in part on the spatial transmit identifiers of the CSI report, for example, as described in connection with 1622 of FIG. 16.

The apparatus may include additional components that perform each of the blocks of the algorithm in the flowcharts of FIGS. 15 and/or 16. As such, each block in the flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband processor 1704, includes means for transmitting, to a responding sidelink UE, a request to provide CSI feedback, the request excluding a CSI-RS. The example apparatus 1702 also includes means for transmitting a transmission to a neighboring sidelink UE, the transmission including a CSI feedback trigger. The example apparatus 1702 also includes means for receiving, from the responding sidelink UE, a CSI report based on the transmission.

In another configuration, the example apparatus 1702 also includes means for transmitting a configuration to the responding sidelink UE indicating one or more characteristics associated with the CSI report. The example apparatus 1702 also includes means for transmitting the configuration via Layer 3 signaling.

In another configuration, the example apparatus 1702 also includes means for transmitting sidelink transmissions to members of the group of UEs using a same transmit power.

In another configuration, the example apparatus 1702 also includes means for computing a CSI sample based on the transmission.

In another configuration, the example apparatus 1702 also includes means for transmitting a transmission trigger to the responding sidelink UE. The example apparatus 1702 also includes means for transmitting a second transmission directed to the responding sidelink UE, the second transmission including the transmission trigger and a sidelink CSI-RS. The example apparatus 1702 also includes means for receiving a second CSI report including a second CSI sample based on the sidelink CSI-RS of the second transmission.

In another configuration, the example apparatus 1702 also includes means for transmitting a transmission trigger indicating a time-window in a time-domain, the time-window occurring after transmitting the transmission trigger in the time-domain. The example apparatus 1702 also includes means for receiving the CSI report after the time-window expires, the CSI report including CSI samples for each transmission of a set of transmissions that is associated with a transmission destination ID included in the set of destination IDs, the set of transmissions transmitted during the time-window.

In another configuration, the example apparatus 1702 also includes means for periodically receives the CSI report via a MAC-CE.

In another configuration, the example apparatus 1702 also includes means for configuring the responding sidelink UE to transmit a time-frequency stamp with the CSI report.

In another configuration, the example apparatus 1702 also includes means for receiving a delta CQI via a sidelink feedback channel.

In another configuration, the example apparatus 1702 also includes means for encoding sidelink control information of the transmission to include spatial transmit identifiers associated with the transmission. The example apparatus 1702 also includes means for performing, with the responding sidelink UE, a beamforming alignment procedure based at least in part on the spatial transmit identifiers linked to the CQI.

The means may be one or more of the components of the apparatus 1702 configured to perform the functions recited by the means. As described supra, the apparatus 1702 may include the TX processor 368, the RX processor 356, and the controller/processor 359. As such, in one configuration, the means may be the TX processor 368, the RX processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a responding sidelink UE including at least one processor coupled to a memory and configured to receive, from an initiating sidelink UE, a request to provide CSI feedback to the initiating sidelink UE, the request excluding a CSI-RS; decode a transmission from the initiating sidelink UE to a neighboring sidelink UE, the transmission including a CSI feedback trigger; and transmit, to the initiating sidelink UE, a CSI report based on the transmission.

Aspect 2 is the apparatus of aspect 1, further including that the memory and the at least one processor are further configured to: receive a configuration indicating one or more characteristics associated with the CSI report.

Aspect 3 is the apparatus of any of aspects 1 and 2, further including that the memory and the at least one processor are configured to receive the configuration via Layer 3 signaling.

Aspect 4 is the apparatus of any of aspects 1 to 3, further including that the configuration indicates that the CSI feedback trigger includes one or more of: a sidelink control channel DMRS, a sidelink data channel DMRS, and a sidelink CSI-RS.

Aspect 5 is the apparatus of any of aspects 1 to 4, further including that the configuration indicates a set of destination IDs associated with a group of UEs, the group of UEs including at least the responding sidelink UE and the neighboring sidelink UE.

Aspect 6 is the apparatus of any of aspects 1 to 5, further including that to decode the transmission, the memory and the at least one processor are configured to: decode SCI of the transmission to obtain a transmission destination ID associated with the transmission; and compute a CSI sample based on the transmission when the set of destination IDs includes the transmission destination ID.

Aspect 7 is the apparatus of any of aspects 1 to 6, further including that the SCI further includes a value indicating to the memory and the at least one processor to compute the CSI sample based on the transmission.

Aspect 8 is the apparatus of any of aspects 1 to 7, further including that the memory and the at least one processor are further configured to: receive a transmission trigger from the initiating sidelink UE, wherein the CSI report includes CSI samples computed for each transmission of a set of transmissions that is associated with a transmission destination ID included in the set of destination IDs, the set of transmissions decoded during a time-window occurring prior to receiving the transmission trigger in a time-domain.

Aspect 9 is the apparatus of any of aspects 1 to 8, further including that the memory and the at least one processor are further configured to: receive, from the initiating sidelink UE, a second transmission directed to the responding sidelink UE, the second transmission including the transmission trigger and a sidelink CSI-RS; compute a second CSI sample based on the sidelink CSI-RS; and transmit a second CSI report including the second CSI sample.

Aspect 10 is the apparatus of any of aspects 1 to 9, further including that the second CSI report includes narrowband CSI based on the second transmission, and the CSI report includes additional CSI based on sub-channels associated with each transmission of the set of transmissions.

Aspect 11 is the apparatus of any of aspects 1 to 10, further including that the memory and the at least one processor are further configured to: receive a transmission trigger indicating a time-window in a time-domain, the time-window occurring after receiving the transmission trigger in the time-domain; and compute CSI samples for each transmission of a set of transmissions that is associated with a transmission destination ID included in the set of destination IDs, the set of transmissions decoded during the time-window, and transmit the CSI report after the time-window expires, the CSI report including the CSI samples.

Aspect 12 is the apparatus of any of aspects 1 to 11, further including that the memory and the at least one processor are configured to periodically transmit the CSI report via a MAC-CE.

Aspect 13 is the apparatus of any of aspects 1 to 12, further including that the configuration indicates a threshold samples quantity, the memory and the at least one processor configured to transmit the MAC-CE when the CSI report includes at least the threshold samples quantity.

Aspect 14 is the apparatus of any of aspects 1 to 13, further including that the configuration indicates a CSI-triggering event, the memory and the at least one processor configured to transmit the CSI report via a MAC-CE based on an occurrence of the CSI-triggering event.

Aspect 15 is the apparatus of any of aspects 1 to 14, further including that the CSI-triggering event includes a threshold change in a property of the CSI report and a second CSI report.

Aspect 16 is the apparatus of any of aspects 1 to 15, further including that the configuration configures the memory and the at least one processor to transmit a time-frequency stamp with the CSI report.

Aspect 17 is the apparatus of any of aspects 1 to 16, further including that the configuration further indicates a set of destination IDs associated with a group of UEs, the memory and the at least one processor configured to transmit the time-frequency stamp with the CSI report when the set of destination IDs excludes a transmission destination ID associated with the transmission.

Aspect 18 is the apparatus of any of aspects 1 to 17, further including that the configuration configures the memory and the at least one processor to transmit a delta CQI via a sidelink feedback channel.

Aspect 19 is the apparatus of any of aspects 1 to 18, further including that the memory and the at least one processor are configured to encode the delta CQI with: a first value when the delta CQI is greater than a first threshold, a second value when the delta CQI is less than or equal to the first threshold and greater than a second threshold, or a third value when the delta CQI is less than or equal to the second threshold.

Aspect 20 is the apparatus of any of aspects 1 to 19, further including that to decode the transmission, the memory and the at least one processor are configured to: decode sidelink control information of the transmission to obtain spatial transmit identifiers associated with the transmission; and compute CSI including CQI based on the spatial transmit identifiers, the CSI report including an indicator that the CQI is linked to the spatial transmit identifiers.

Aspect 21 is the apparatus of any of aspects 1 to 20, further including that the memory and the at least one processor are further configured to: perform, with the initiating sidelink UE, a beamforming alignment procedure based at least in part on the spatial transmit identifiers linked to the CQI.

Aspect 22 is the apparatus of any of aspects 1 to 21, further including a transceiver coupled to the at least one processor.

Aspect 23 is a method of wireless communication for implementing any of aspects 1 to 22.

Aspect 24 is an apparatus for wireless communication including means for implementing any of aspects 1 to 22.

Aspect 25 is a non-transitory computer-readable storage medium storing computer executable code, where the code, when executed, causes a processor to implement any of aspects 1 to 22.

Aspect 26 is an apparatus for wireless communication at an initiating sidelink UE including at least one processor coupled to a memory and configured to transmit, to a responding sidelink UE, a request to provide CSI feedback, the request excluding a CSI-RI; transmit a transmission to a neighboring sidelink UE, the transmission including a CSI feedback trigger; and receive, from the responding sidelink UE, a CSI report based on the transmission.

Aspect 27 is the apparatus of aspect 26, further including that the memory and the at least one processor are further configured to: transmit a configuration to the responding sidelink UE indicating one or more characteristics associated with the CSI report.

Aspect 28 is the apparatus of any of aspects 26 and 27, further including that the memory and the at least one processor are further configured to transmit the configuration via Layer 3 signaling.

Aspect 29 is the apparatus of any of aspects 26 to 28, further including that the configuration indicates that the CSI feedback trigger includes one or more of: a sidelink control channel DMRS, a sidelink data channel DMRS, and a sidelink CSI-RS.

Aspect 30 is the apparatus of any of aspects 26 to 29, further including that the configuration indicates a set of destination IDs associated with a group of UEs, the group of UEs including at least the responding sidelink UE and the neighboring sidelink UE.

Aspect 31 is the apparatus of any of aspects 26 to 30, further including that SCI of the transmission includes a transmission destination ID associated with the neighboring sidelink UE, the set of destination IDs including the transmission destination ID.

Aspect 32 is the apparatus of any of aspects 26 to 31, further including that the memory and the at least one processor are further configured to transmit sidelink transmissions to members of the group of UEs using a same transmit power.

Aspect 33 is the apparatus of any of aspects 26 to 32, further including that the SCI further includes a value indicating to the responding sidelink UE to compute a CSI sample based on the transmission.

Aspect 34 is the apparatus of any of aspects 26 to 33, further including that the memory and the at least one processor are further configured to: transmit a transmission trigger to the responding sidelink UE, wherein the CSI report includes CSI samples computed for each transmission of a set of transmissions that is associated with a transmission destination ID included in the set of destination IDs, the set of transmissions transmitted during a time-window occurring prior to transmitting the transmission trigger in a time-domain.

Aspect 35 is the apparatus of any of aspects 26 to 34, further including that the memory and the at least one processor are further configured to: transmit a second transmission directed to the responding sidelink UE, the second transmission including the transmission trigger and a sidelink CSI-RS; and receive a second CSI report including a second CSI sample based on the sidelink CSI-RS of the second transmission.

Aspect 36 is the apparatus of any of aspects 26 to 35, further including that the second CSI report includes narrowband CSI based on the second transmission, and the CSI report includes additional CSI based on sub-channels associated with each transmission of the set of transmissions.

Aspect 37 is the apparatus of any of aspects 26 to 36, further including that the memory and the at least one processor are further configured to: transmit a transmission trigger indicating a time-window in a time-domain, the time-window occurring after transmitting the transmission trigger in the time-domain, and receive the CSI report after the time-window expires, the CSI report including CSI samples for each transmission of a set of transmissions that is associated with a transmission destination ID included in the set of destination IDs, the set of transmissions transmitted during the time-window.

Aspect 38 is the apparatus of any of aspects 26 to 37, further including that the memory and the at least one processor are further configured to periodically receive the CSI report via a MAC-CE.

Aspect 39 is the apparatus of any of aspects 26 to 38, further including that the configuration indicates a threshold samples quantity, and the CSI report includes at least the threshold samples quantity.

Aspect 40 is the apparatus of any of aspects 26 to 39, further including that the configuration indicates a CSI-triggering event.

Aspect 41 is the apparatus of any of aspects 26 to 40, further including that the CSI-triggering event includes a threshold change in a property of the CSI report and a second CSI report.

Aspect 42 is the apparatus of any of aspects 26 to 41, further including that the configuration configures the responding sidelink UE to transmit a time-frequency stamp with the CSI report.

Aspect 43 is the apparatus of any of aspects 26 to 42, further including that the memory and the at least one processor are further configured to: receive a delta CQI via a sidelink feedback channel.

Aspect 44 is the apparatus of any of aspects 26 to 43, further including that the delta CQI is encoded using: a first value when the delta CQI is greater than a first threshold, a second value when the delta CQI is less than or equal to the first threshold and greater than a second threshold, or a third value when the delta CQI is less than or equal to the second threshold.

Aspect 45 is the apparatus of any of aspects 26 to 44, further including that the memory and the at least one processor are further configured to: encode sidelink control information of the transmission to include spatial transmit identifiers associated with the transmission, wherein the CSI report includes CQI based on the spatial transmit identifiers, the CSI report including an indicator that the CQI is linked to the spatial transmit identifiers.

Aspect 46 is the apparatus of any of aspects 26 to 45, further including that the memory and the at least one processor are further configured to: perform, with the responding sidelink UE, a beamforming alignment procedure based at least in part on the spatial transmit identifiers linked to the CQI.

Aspect 47 is the apparatus of any of aspects 26 to 46, further including a transceiver coupled to the at least one processor.

Aspect 48 is a method of wireless communication for implementing any of aspects 26 to 47.

Aspect 49 is an apparatus for wireless communication including means for implementing any of aspects 26 to 47.

Aspect 50 is a non-transitory computer-readable storage medium storing computer executable code, where the code, when executed, causes a processor to implement any of aspects 26 to 47.

What is claimed is:

1. An apparatus for wireless communication at a responding sidelink user equipment (UE), comprising:
  a memory; and
  at least one processor coupled to the memory, the memory and the at least one processor configured to:
    receive, from an initiating sidelink UE, a request to provide channel state information (CSI) feedback to the initiating sidelink UE, the request excluding a CSI reference signal (CSI-RS);
    decode a transmission from the initiating sidelink UE to a neighboring sidelink UE, the transmission including a CSI feedback trigger; and
    transmit, to the initiating sidelink UE, a CSI report based on the transmission.

2. The apparatus of claim 1, wherein the memory and the at least one processor are further configured to:
  receive a configuration indicating one or more characteristics associated with the CSI report.

3. The apparatus of claim 2, wherein the configuration indicates a set of destination identifiers (IDs) associated with a group of UEs, the group of UEs including at least the responding sidelink UE and the neighboring sidelink UE.

4. The apparatus of claim 3, wherein to decode the transmission, the memory and the at least one processor are configured to:
   decode sidelink control information (SCI) of the transmission to obtain a transmission destination ID associated with the transmission; and
   compute a CSI sample based on the transmission when the set of destination IDs includes the transmission destination ID.

5. The apparatus of claim 3, wherein the memory and the at least one processor are further configured to:
   receive a transmission trigger from the initiating sidelink UE,
   wherein the CSI report includes CSI samples computed for each transmission of a set of transmissions that is associated with a transmission destination ID included in the set of destination IDs, the set of transmissions decoded during a time-window occurring prior to receiving the transmission trigger in a time-domain.

6. The apparatus of claim 3, wherein the memory and the at least one processor are further configured to:
   receive a transmission trigger indicating a time-window in a time-domain, the time-window occurring after receiving the transmission trigger in the time-domain; and
   compute CSI samples for each transmission of a set of transmissions that is associated with a transmission destination ID included in the set of destination IDs, the set of transmissions decoded during the time-window, and transmit the CSI report after the time-window expires, the CSI report including the CSI samples.

7. The apparatus of claim 2, wherein the configuration indicates a CSI-triggering event, the memory and the at least one processor configured to transmit the CSI report via a medium access control-control element (MAC-CE) based on an occurrence of the CSI-triggering event.

8. The apparatus of claim 2, wherein the configuration configures the memory and the at least one processor to transmit a time-frequency stamp with the CSI report.

9. The apparatus of claim 2, wherein the configuration configures the memory and the at least one processor to transmit a delta channel quality indicator (CQI) via a sidelink feedback channel.

10. The apparatus of claim 1, wherein to decode the transmission, the memory and the at least one processor are configured to:
    decode sidelink control information of the transmission to obtain spatial transmit identifiers associated with the transmission; and
    compute CSI including channel quality indicators (CQI) based on the spatial transmit identifiers, the CSI report including an indicator that the CQI is linked to the spatial transmit identifiers.

11. The apparatus of claim 1, further comprising a transceiver coupled to the at least one processor.

12. A method of wireless communication at a responding sidelink user equipment (UE), comprising:
    receiving, from an initiating sidelink UE, a request to provide channel state information (CSI) feedback to the initiating sidelink UE, the request excluding a CSI reference signal (CSI-RS);
    decoding a transmission from the initiating sidelink UE to a neighboring sidelink UE, the transmission including a CSI feedback trigger; and
    transmitting, to the initiating sidelink UE, a CSI report based on the transmission.

13. The method of claim 12, further comprising:
    receiving a configuration indicating one or more characteristics associated with the CSI report.

14. The method of claim 13, wherein the configuration indicates a set of destination identifiers (IDs) associated with a group of UEs, the group of UEs including at least the responding sidelink UE and the neighboring sidelink UE.

15. The method of claim 14, wherein decoding the transmission includes:
    decoding sidelink control information (SCI) of the transmission to obtain a transmission destination ID associated with the transmission; and
    computing a CSI sample based on the transmission when the set of destination IDs includes the transmission destination ID.

16. The method of claim 14, further comprising:
    receiving a transmission trigger from the initiating sidelink UE,
    wherein the CSI report includes CSI samples computed for each transmission of a set of transmissions that is associated with a transmission destination ID included in the set of destination IDs, the set of transmissions decoded during a time-window occurring prior to receiving the transmission trigger in a time-domain.

17. The method of claim 14, further comprising:
    receiving a transmission trigger indicating a time-window in a time-domain, the time-window occurring after receiving the transmission trigger in the time-domain; and
    computing CSI samples for each transmission of a set of transmissions that is associated with a transmission destination ID included in the set of destination IDs, the set of transmissions decoded during the time-window,
    wherein the responding sidelink UE transmits the CSI report after the time-window expires, the CSI report including the CSI samples.

18. The method of claim 13, wherein the configuration indicates a CSI-triggering event, and the responding sidelink UE transmits the CSI report via a medium access control-control element (MAC-CE) based on an occurrence of the CSI-triggering event.

19. The method of claim 13, wherein the configuration configures the responding sidelink UE to transmit a time-frequency stamp with the CSI report.

20. The method of claim 13, wherein the configuration configures the responding sidelink UE to transmit a delta channel quality indicator (CQI) via a sidelink feedback channel.

21. The method of claim 12, wherein decoding the transmission includes:
    decoding sidelink control information of the transmission to obtain spatial transmit identifiers associated with the transmission; and
    computing CSI including channel quality indicators (CQI) based on the spatial transmit identifiers, the CSI report including an indicator that the CQI is linked to the spatial transmit identifiers.

22. An apparatus for wireless communication at an initiating sidelink user equipment (UE), comprising:
    a memory; and
    at least one processor coupled to the memory, the memory and the at least one processor configured to:
    transmit, to a responding sidelink UE, a request to provide channel state information (CSI) feedback, the request excluding a CSI reference signal (CSI-RS);

transmit a transmission to a neighboring sidelink UE, the transmission including a CSI feedback trigger; and receive, from the responding sidelink UE, a CSI report based on the transmission.

23. The apparatus of claim 22, wherein the memory and the at least one processor are further configured to:

transmit a configuration to the responding sidelink UE indicating one or more characteristics associated with the CSI report.

24. The apparatus of claim 23, wherein the configuration indicates a set of destination identifiers (IDs) associated with a group of UEs, the group of UEs including at least the responding sidelink UE and the neighboring sidelink UE.

25. The apparatus of claim 24, wherein the memory and the at least one processor are further configured to:

transmit a transmission trigger indicating a time-window in a time-domain, the time-window occurring after transmitting the transmission trigger in the time-domain, and receive the CSI report after the time-window expires, the CSI report including CSI samples for each transmission of a set of transmissions that is associated with a transmission destination ID included in the set of destination IDs, the set of transmissions transmitted during the time-window.

26. The apparatus of claim 22, further comprising a transceiver coupled to the at least one processor.

27. A method of wireless communication at an initiating sidelink user equipment (UE), comprising:

transmitting, to a responding sidelink UE, a request to provide channel state information (CSI) feedback, the request excluding a CSI reference signal (CSI-RS);

transmitting a transmission to a neighboring sidelink UE, the transmission including a CSI feedback trigger; and receiving, from the responding sidelink UE, a CSI report based on the transmission.

28. The method of claim 27, further comprising:

transmitting a configuration to the responding sidelink UE indicating one or more characteristics associated with the CSI report.

29. The method of claim 28, wherein the configuration indicates a set of destination identifiers (IDs) associated with a group of UEs, the group of UEs including at least the responding sidelink UE and the neighboring sidelink UE.

30. The method of claim 29, further comprising:

transmitting a transmission trigger indicating a time-window in a time-domain, the time-window occurring after transmitting the transmission trigger in the time-domain, wherein the initiating sidelink UE receives the CSI report after the time-window expires, the CSI report including CSI samples for each transmission of a set of transmissions that is associated with a transmission destination ID included in the set of destination IDs, the set of transmissions transmitted during the time-window.

* * * * *